United States Patent
Karabinis

(10) Patent No.: US 9,332,429 B2
(45) Date of Patent: *May 3, 2016

(54) SYSTEMS/METHODS OF ADAPTIVELY VARYING A SPECTRAL CONTENT OF COMMUNICATIONS

(71) Applicant: Odyssey Wireless, Inc., Cary, NC (US)

(72) Inventor: Peter D. Karabinis, Cary, NC (US)

(73) Assignee: Odyssey Wireless, Inc., Cary, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 14/456,649

(22) Filed: Aug. 11, 2014

(65) Prior Publication Data

US 2014/0348211 A1 Nov. 27, 2014

Related U.S. Application Data

(63) Continuation of application No. 14/287,473, filed on May 27, 2014, now Pat. No. 8,855,230, which is a continuation of application No. 14/187,899, filed on Feb. 24, 2014, now Pat. No. 8,811,502, which is a (Continued)

(51) Int. Cl.
*H04B 1/00* (2006.01)
*H04W 12/04* (2009.01)
(Continued)

(52) U.S. Cl.
CPC ............... *H04W 12/04* (2013.01); *H04B 1/69* (2013.01); *H04B 1/707* (2013.01); *H04B 1/7097* (2013.01);
(Continued)

(58) Field of Classification Search
CPC ............ H04L 1/0043; H04L 25/03834; H04L 25/03987; H04L 1/009; H04L 1/0091; H04L 23/02; H04B 1/707; H04B 1/7097; H04B 1/69; H04W 12/06; H04W 36/18; H04W 12/04; H04K 1/00; H04K 3/827; H04K 3/25
See application file for complete search history.

(56) References Cited

U.S. PATENT DOCUMENTS

| 4,393,276 A | 7/1983 | Steele |
| 4,635,276 A | 1/1987 | Karabinis |

(Continued)

FOREIGN PATENT DOCUMENTS

| EP | 0 869 647 A2 | 10/1998 |
| EP | 1 328 071 A1 | 7/2003 |

(Continued)

OTHER PUBLICATIONS

3G Americas, "UMTS Evolution from 3GPP Release 7 to Release 8 HSPA and SAE/LTE", Jul. 2007, 89 pp.

(Continued)

*Primary Examiner* — Erin File
(74) *Attorney, Agent, or Firm* — Myers Bigel & Sibley, P.A.

(57) ABSTRACT

A spectral content of a baseband waveform is varied and a measure of the baseband waveform whose spectral content has been varied is used by a transmitter in order to convey information. According to embodiments of inventive concepts, a set of frequencies that is used to provide spectral content to the baseband waveform is varied. In some embodiments, the spectral content comprises non-contiguous first and second frequency intervals wherein a third frequency interval that is between the first and second frequency intervals remains substantially devoid of providing spectral content in order to reduce or avoid interference. In other embodiments, the spectral content that is varied comprises a bandwidth that is varied. The inventive concepts are relevant to 4G LTE carrier aggregation systems/methods and/or other aspects of 4G LTE. Various transmitter/receiver embodiments are disclosed including direct synthesis transmitter/receiver embodiments.

109 Claims, 9 Drawing Sheets

Related U.S. Application Data continuation of application No. 13/011,451, filed on Jan. 21, 2011, now Pat. No. 8,670,493, which is a continuation-in-part of application No. 12/372,354, filed on Feb. 17, 2009, now Pat. No. 7,876,845, and a continuation-in-part of application No. 11/720,115, filed as application No. PCT/US2006/020417 on May 25, 2006, now Pat. No. 8,050,337.

(60) Provisional application No. 61/033,114, filed on Mar. 3, 2008, provisional application No. 60/692,932, filed on Jun. 22, 2005, provisional application No. 60/698,247, filed on Jul. 11, 2005.

(51) Int. Cl.

| | |
|---|---|
| *H04B 1/69* | (2011.01) |
| *H04B 1/707* | (2011.01) |
| *H04B 1/7097* | (2011.01) |
| *H04K 1/00* | (2006.01) |
| *H04K 3/00* | (2006.01) |
| *H04L 1/00* | (2006.01) |
| *H04L 23/02* | (2006.01) |
| *H04L 25/03* | (2006.01) |
| *H04W 12/06* | (2009.01) |
| *H04W 12/08* | (2009.01) |
| *H04W 36/18* | (2009.01) |
| *H04W 48/02* | (2009.01) |
| *H04W 88/08* | (2009.01) |
| *H04L 5/00* | (2006.01) |

(52) U.S. Cl.
CPC .. *H04K 1/00* (2013.01); *H04K 3/25* (2013.01); *H04K 3/827* (2013.01); *H04L 1/009* (2013.01); *H04L 1/0043* (2013.01); *H04L 1/0091* (2013.01); *H04L 23/02* (2013.01); *H04L 25/03834* (2013.01); *H04L 25/03987* (2013.01); *H04W 12/06* (2013.01); *H04W 12/08* (2013.01); *H04W 36/18* (2013.01); *H04W 48/02* (2013.01); *H04W 88/08* (2013.01); *H04B 2201/70715* (2013.01); *H04K 2203/18* (2013.01); *H04L 5/0007* (2013.01); *H04L 25/03866* (2013.01)

(56) References Cited

U.S. PATENT DOCUMENTS

| | | | |
|---|---|---|---|
| 4,679,227 A | 7/1987 | Hughes-Hartogs | |
| 4,731,816 A | 3/1988 | Hughes-Hartogs | |
| 4,757,495 A | 7/1988 | Decker et al. | |
| 4,833,706 A | 5/1989 | Hughes-Hartogs | |
| 4,882,668 A | 11/1989 | Schmid et al. | |
| 4,980,897 A | 12/1990 | Decker et al. | |
| 5,029,184 A | 7/1991 | Andren et al. | |
| 5,054,034 A | 10/1991 | Hughes-Hartogs | |
| 5,117,401 A | 5/1992 | Feintuch | |
| 5,157,688 A | 10/1992 | Dell-Imagine | |
| 5,394,433 A | 2/1995 | Bantz et al. | |
| 5,479,447 A | 12/1995 | Chow et al. | |
| 5,548,582 A | 8/1996 | Brajal et al. | |
| 5,559,828 A | 9/1996 | Armstrong et al. | |
| 5,610,908 A | 3/1997 | Shelswell et al. | |
| 5,724,380 A | 3/1998 | Ritter | |
| 5,726,978 A | 3/1998 | Frodigh et al. | |
| 5,737,326 A | 4/1998 | I et al. | |
| 5,778,029 A | 7/1998 | Kaufmann | |
| 5,848,160 A | 12/1998 | Cai et al. | |
| 5,870,378 A | 2/1999 | Huang et al. | |
| 5,881,056 A | 3/1999 | Huang et al. | |
| 5,910,950 A | 6/1999 | ten Brink | |
| 5,956,373 A | 9/1999 | Goldston et al. | |
| 5,966,312 A | 10/1999 | Chen | |
| 6,026,125 A | 2/2000 | Larrick et al. | |
| 6,140,935 A | 10/2000 | Hayton et al. | |
| 6,141,567 A | 10/2000 | Youssefmir et al. | |
| 6,175,550 B1 | 1/2001 | Van Nee | |
| 6,198,730 B1 | 3/2001 | Hogberg et al. | |
| 6,243,370 B1 | 6/2001 | Schilling | |
| 6,246,713 B1 | 6/2001 | Mattison | |
| 6,295,461 B1 | 9/2001 | Palmer et al. | |
| 6,351,461 B1 | 2/2002 | Sakoda et al. | |
| 6,389,002 B1 | 5/2002 | Schilling | |
| 6,407,989 B2 | 6/2002 | Schilling | |
| 6,408,019 B1 | 6/2002 | Pickering et al. | |
| 6,415,032 B1 | 7/2002 | Doland | |
| 6,433,720 B1 | 8/2002 | Libove et al. | |
| 6,466,629 B1 | 10/2002 | Isaksson et al. | |
| 6,473,449 B1 | 10/2002 | Cafarella et al. | |
| 6,484,260 B1 | 11/2002 | Scott et al. | |
| 6,535,550 B1 | 3/2003 | Cole | |
| 6,538,787 B1* | 3/2003 | Moeller et al. | 398/158 |
| 6,564,187 B1* | 5/2003 | Kikumoto et al. | 704/503 |
| 6,598,200 B1 | 7/2003 | Greenwood et al. | |
| 6,654,408 B1 | 11/2003 | Kadous et al. | |
| 6,658,044 B1 | 12/2003 | Cho et al. | |
| 6,661,847 B1 | 12/2003 | Davis et al. | |
| 6,683,953 B1 | 1/2004 | Kasahara et al. | |
| 6,690,736 B1 | 2/2004 | André | |
| 6,697,013 B2 | 2/2004 | McFarland et al. | |
| 6,711,145 B2 | 3/2004 | Schilling | |
| 6,714,511 B1 | 3/2004 | Sudo et al. | |
| 6,765,895 B1 | 7/2004 | Watanabe | |
| 6,765,969 B1 | 7/2004 | Vook et al. | |
| 6,799,141 B1 | 9/2004 | Stoustrup et al. | |
| 6,868,114 B2 | 3/2005 | Bially et al. | |
| 6,922,570 B2 | 7/2005 | Awater et al. | |
| 6,965,992 B1 | 11/2005 | Joseph et al. | |
| 6,980,609 B1 | 12/2005 | Ahn | |
| 6,987,747 B1 | 1/2006 | Mottier et al. | |
| 7,017,047 B2 | 3/2006 | Vanska et al. | |
| 7,020,125 B2 | 3/2006 | Schilling | |
| 7,020,165 B2 | 3/2006 | Rakib et al. | |
| 7,058,115 B2 | 6/2006 | Castelain | |
| 7,061,881 B2 | 6/2006 | Mottier et al. | |
| 7,113,601 B2 | 9/2006 | Ananda | |
| 7,123,580 B2 | 10/2006 | Tang et al. | |
| 7,145,933 B1 | 12/2006 | Szajnowski | |
| 7,155,340 B2 | 12/2006 | Churan | |
| 7,161,927 B2 | 1/2007 | Wu et al. | |
| 7,190,683 B2 | 3/2007 | Giallorenzi et al. | |
| 7,200,177 B2 | 4/2007 | Miyoshi | |
| 7,203,157 B2 | 4/2007 | Castelain | |
| 7,203,490 B2 | 4/2007 | Karabinis et al. | |
| 7,206,333 B2 | 4/2007 | Choi et al. | |
| 7,218,693 B2 | 5/2007 | Troulis | |
| 7,254,158 B2 | 8/2007 | Agrawal et al. | |
| 7,260,054 B2 | 8/2007 | Olszewski | |
| 7,263,333 B2 | 8/2007 | Roberts | |
| 7,280,552 B2 | 10/2007 | Isson | |
| 7,286,517 B2 | 10/2007 | Brunel | |
| 7,286,603 B2 | 10/2007 | Varshney et al. | |
| 7,289,459 B2 | 10/2007 | Hayashi et al. | |
| 7,289,972 B2 | 10/2007 | Rieser et al. | |
| 7,292,627 B2 | 11/2007 | Tzannes | |
| 7,295,509 B2 | 11/2007 | Laroia | |
| 7,295,637 B2 | 11/2007 | Papathanasiou et al. | |
| 7,313,124 B2 | 12/2007 | Lim et al. | |
| 7,327,775 B1 | 2/2008 | Gu | |
| 7,330,513 B2 | 2/2008 | Tsai et al. | |
| 7,333,422 B2 | 2/2008 | Amer | |
| 7,333,538 B2 | 2/2008 | Castelain et al. | |
| 7,336,636 B2 | 2/2008 | Salzer | |
| 7,342,910 B2 | 3/2008 | Mottier et al. | |
| 7,346,125 B2 | 3/2008 | Washakowski et al. | |
| 7,349,460 B2 | 3/2008 | Choi et al. | |
| 7,362,695 B2 | 4/2008 | Akahori | |
| 7,362,829 B2 | 4/2008 | Ojard | |
| 7,366,243 B1 | 4/2008 | McCrady | |
| 7,372,890 B2 | 5/2008 | Batra et al. | |
| 7,391,715 B2 | 6/2008 | Lee et al. | |

(56) References Cited

U.S. PATENT DOCUMENTS

| | | |
|---|---|---|
| 7,394,865 B2 | 7/2008 | Borran et al. |
| 7,400,686 B2 | 7/2008 | Borran et al. |
| 7,406,067 B2 | 7/2008 | Deng et al. |
| 7,418,053 B2 | 8/2008 | Perlman et al. |
| 7,428,248 B2 | 9/2008 | Mottier |
| 7,443,904 B2 | 10/2008 | Choi et al. |
| 7,444,170 B2 | 10/2008 | Karabinis |
| 7,450,658 B2 | 11/2008 | Tsai et al. |
| 7,454,175 B2 | 11/2008 | Karabinis |
| 7,483,493 B2 | 1/2009 | Bar-Ness et al. |
| 7,483,672 B2 | 1/2009 | Hart et al. |
| 7,505,522 B1 | 3/2009 | Larsson |
| 7,522,514 B2 | 4/2009 | Tzannes et al. |
| 7,539,123 B2 | 5/2009 | Rhodes |
| 7,545,772 B2 | 6/2009 | Hwang et al. |
| 7,548,506 B2 | 6/2009 | Ma et al. |
| 7,548,577 B2 | 6/2009 | Pan et al. |
| 7,555,047 B2 | 6/2009 | Zhang |
| 7,561,212 B2 | 7/2009 | Nakamura |
| 7,564,822 B2 | 7/2009 | Das et al. |
| 7,564,906 B2 | 7/2009 | Wang et al. |
| 7,583,766 B2 | 9/2009 | Hongming et al. |
| 7,587,171 B2 | 9/2009 | Evans et al. |
| 7,602,696 B2 | 10/2009 | Rhodes |
| 7,613,242 B2 | 11/2009 | Bykovnikov |
| 7,616,704 B2 | 11/2009 | Li et al. |
| 7,620,096 B2 | 11/2009 | Bar-Ness et al. |
| 7,660,289 B2 | 2/2010 | Yellin et al. |
| 7,668,253 B2 | 2/2010 | Hwang et al. |
| 7,672,381 B1 | 3/2010 | Kleider et al. |
| 7,680,211 B1 | 3/2010 | von der Embse |
| 7,733,940 B2 | 6/2010 | Dooley et al. |
| 7,738,571 B2 | 6/2010 | Costa et al. |
| 7,751,509 B1 | 7/2010 | Lehnert |
| 7,756,002 B2 | 7/2010 | Batra et al. |
| 7,787,431 B2 | 8/2010 | Li et al. |
| 7,804,765 B2 | 9/2010 | Tzannes et al. |
| 7,830,995 B2 | 11/2010 | Ojard |
| 7,860,179 B2 | 12/2010 | Bar-Ness et al. |
| 7,869,497 B2 | 1/2011 | Benvenuto et al. |
| 7,876,845 B2 | 1/2011 | Karabinis |
| 7,912,135 B2 | 3/2011 | Kwak et al. |
| 7,916,625 B2 | 3/2011 | Tzannes et al. |
| 7,949,032 B1 * | 5/2011 | Frost |
| 7,970,345 B2 * | 6/2011 | Cummiskey et al. ........ 455/12.1 |
| 7,974,176 B2 | 7/2011 | Zheng |
| 8,050,337 B2 | 11/2011 | Karabinis |
| 8,054,866 B2 | 11/2011 | Sasaoka et al. |
| 8,077,780 B2 | 12/2011 | Schilling et al. |
| 8,094,734 B2 | 1/2012 | Okamoto |
| 8,107,356 B2 | 1/2012 | Cho et al. |
| 8,185,931 B1 | 5/2012 | Reeves |
| 8,223,735 B2 | 7/2012 | Wang et al. |
| 8,233,554 B2 | 7/2012 | Karabinis |
| 8,305,875 B2 | 11/2012 | Lim et al. |
| 8,325,590 B2 | 12/2012 | Hudson |
| 8,325,594 B2 | 12/2012 | Cho et al. |
| 8,374,266 B2 | 2/2013 | Zhang et al. |
| 8,385,296 B2 | 2/2013 | Lee |
| 8,406,276 B2 | 3/2013 | Michaels et al. |
| 8,437,470 B2 | 5/2013 | Mantin et al. |
| 8,484,272 B2 | 7/2013 | Gore et al. |
| 8,576,940 B2 | 11/2013 | Karabinis |
| 8,638,870 B2 | 1/2014 | Sutivong et al. |
| 8,649,451 B2 | 2/2014 | Sutivong et al. |
| 8,660,169 B1 * | 2/2014 | Karabinis ..................... 375/219 |
| 8,817,897 B2 | 8/2014 | Sutivong et al. |
| 8,831,115 B2 | 9/2014 | Sutivong et al. |
| 2001/0048538 A1 | 12/2001 | Kowalski |
| 2001/0050926 A1 | 12/2001 | Kumar |
| 2002/0065099 A1 | 5/2002 | Bjorndahl |
| 2002/0083330 A1 | 6/2002 | Shiomi et al. |
| 2002/0122499 A1 | 9/2002 | Kannan et al. |
| 2002/0126741 A1 | 9/2002 | Baum et al. |
| 2002/0150109 A1 | 10/2002 | Agee |
| 2002/0159533 A1 | 10/2002 | Crawford |
| 2002/0177446 A1 | 11/2002 | Bugeja |
| 2002/0191534 A1 * | 12/2002 | Silvers et al. ................. 370/206 |
| 2002/0193115 A1 | 12/2002 | Furukawa et al. |
| 2002/0196765 A1 | 12/2002 | Tulino |
| 2003/0053625 A1 | 3/2003 | Bially et al. |
| 2003/0095659 A1 | 5/2003 | Ishihara et al. |
| 2003/0107513 A1 | 6/2003 | Abraham et al. |
| 2003/0112745 A1 | 6/2003 | Zhuang et al. |
| 2003/0156014 A1 * | 8/2003 | Kodama et al. .......... 340/310.01 |
| 2003/0161385 A1 | 8/2003 | Chang et al. |
| 2003/0165113 A1 | 9/2003 | Hudson |
| 2003/0203743 A1 | 10/2003 | Sugar et al. |
| 2003/0223354 A1 | 12/2003 | Olszewski |
| 2003/0228017 A1 * | 12/2003 | Beadle et al. ................. 380/270 |
| 2003/0231714 A1 | 12/2003 | Kjeldsen et al. |
| 2004/0001533 A1 | 1/2004 | Tran et al. |
| 2004/0005013 A1 | 1/2004 | Nunally et al. |
| 2004/0039524 A1 | 2/2004 | Adachi |
| 2004/0059225 A1 * | 3/2004 | Hao et al. ..................... 600/458 |
| 2004/0080315 A1 | 4/2004 | Beevor et al. |
| 2004/0081127 A1 | 4/2004 | Gardner et al. |
| 2004/0086027 A1 | 5/2004 | Shattil |
| 2004/0093224 A1 | 5/2004 | Vanska et al. |
| 2004/0095907 A1 | 5/2004 | Agee et al. |
| 2004/0132417 A1 | 7/2004 | Maeda et al. |
| 2004/0136438 A1 * | 7/2004 | Fullerton et al. .............. 375/130 |
| 2004/0139320 A1 | 7/2004 | Shinohara |
| 2004/0151109 A1 | 8/2004 | Batra et al. |
| 2004/0166857 A1 | 8/2004 | Shim et al. |
| 2004/0170430 A1 | 9/2004 | Gorokhov |
| 2004/0229615 A1 | 11/2004 | Agrawal et al. |
| 2004/0252853 A1 | 12/2004 | Blamey et al. |
| 2005/0013238 A1 | 1/2005 | Hansen |
| 2005/0094597 A1 | 5/2005 | Hwang et al. |
| 2005/0128938 A1 | 6/2005 | Fang et al. |
| 2005/0174966 A1 | 8/2005 | Lansford et al. |
| 2005/0207385 A1 | 9/2005 | Gorokhov et al. |
| 2005/0208944 A1 | 9/2005 | Okita et al. |
| 2005/0232336 A1 | 10/2005 | Balakrishnan et al. |
| 2005/0243938 A1 | 11/2005 | Armstrong et al. |
| 2005/0255878 A1 | 11/2005 | Leinonen et al. |
| 2005/0281321 A1 | 12/2005 | Bergstrom et al. |
| 2006/0009209 A1 | 1/2006 | Rieser et al. |
| 2006/0039553 A1 | 2/2006 | Suen et al. |
| 2006/0045196 A1 | 3/2006 | Reid |
| 2006/0062320 A1 | 3/2006 | Luz et al. |
| 2006/0062391 A1 | 3/2006 | Lee et al. |
| 2006/0084444 A1 | 4/2006 | Kossi et al. |
| 2006/0088187 A1 | 4/2006 | Clarkson et al. |
| 2006/0140249 A1 * | 6/2006 | Kohno .......................... 375/130 |
| 2006/0165100 A1 | 7/2006 | Huang et al. |
| 2006/0165155 A1 | 7/2006 | Liu et al. |
| 2006/0171445 A1 | 8/2006 | Batra et al. |
| 2006/0176966 A1 | 8/2006 | Stewart et al. |
| 2006/0178124 A1 | 8/2006 | Sugar |
| 2006/0203758 A1 | 9/2006 | Tee et al. |
| 2006/0205346 A1 | 9/2006 | Evans et al. |
| 2006/0227889 A1 | 10/2006 | Uchida et al. |
| 2006/0233124 A1 | 10/2006 | Palanki |
| 2006/0233147 A1 | 10/2006 | Karabinis |
| 2006/0239334 A1 | 10/2006 | Kwon et al. |
| 2007/0004465 A1 | 1/2007 | Papasakellariou et al. |
| 2007/0009054 A1 | 1/2007 | Kwak et al. |
| 2007/0015460 A1 | 1/2007 | Karabinis et al. |
| 2007/0032890 A1 | 2/2007 | Zhou et al. |
| 2007/0041311 A1 | 2/2007 | Baum et al. |
| 2007/0053449 A1 | 3/2007 | Adachi |
| 2007/0071127 A1 * | 3/2007 | Gore et al. ..................... 375/267 |
| 2007/0092018 A1 * | 4/2007 | Fonseka et al. ............... 375/265 |
| 2007/0177680 A1 | 8/2007 | Green et al. |
| 2007/0194976 A1 * | 8/2007 | Reed et al. ..................... 342/22 |
| 2007/0211786 A1 | 9/2007 | Shattil |
| 2007/0216488 A1 | 9/2007 | Kultgen |
| 2007/0238475 A1 | 10/2007 | Goedken |
| 2007/0248194 A1 | 10/2007 | Lu |
| 2007/0271606 A1 | 11/2007 | Amann et al. |
| 2007/0281693 A1 | 12/2007 | Ballentin et al. |
| 2007/0285308 A1 | 12/2007 | Bauregger et al. |

(56) References Cited

U.S. PATENT DOCUMENTS

| | | |
|---|---|---|
| 2008/0008471 A1 | 1/2008 | Dress |
| 2008/0019341 A1 | 1/2008 | Perlman |
| 2008/0113624 A1 | 5/2008 | Seidel et al. |
| 2008/0152050 A1 | 6/2008 | Watanabe |
| 2008/0167003 A1 | 7/2008 | Wang et al. |
| 2008/0187066 A1 | 8/2008 | Wang et al. |
| 2008/0215888 A1 | 9/2008 | Barriga et al. |
| 2008/0229108 A1 | 9/2008 | Chase-Salerno et al. |
| 2008/0304605 A1 | 12/2008 | Aziz et al. |
| 2009/0010150 A1 | 1/2009 | Kim et al. |
| 2009/0063111 A1 | 3/2009 | Hollis |
| 2009/0092041 A1 | 4/2009 | Juang |
| 2009/0110033 A1 | 4/2009 | Shattil |
| 2009/0168730 A1 | 7/2009 | Baum et al. |
| 2009/0168844 A1 | 7/2009 | Larsson |
| 2009/0225814 A1 | 9/2009 | Bastug et al. |
| 2009/0252257 A1 | 10/2009 | Sadowsky et al. |
| 2009/0268834 A1 | 10/2009 | Ariyavisitakul et al. |
| 2009/0279422 A1 | 11/2009 | Fonseka et al. |
| 2009/0282472 A1 | 11/2009 | Hamilton, II et al. |
| 2010/0002789 A1 | 1/2010 | Karabinis |
| 2010/0008498 A1 | 1/2010 | Shirai et al. |
| 2010/0024042 A1 | 1/2010 | Motahari et al. |
| 2010/0070874 A1 | 3/2010 | Adamczyk et al. |
| 2010/0121617 A1 | 5/2010 | Gruener et al. |
| 2010/0225752 A1* | 9/2010 | Bench et al. ............. 348/61 |
| 2011/0080877 A1 | 4/2011 | Nentwig |
| 2011/0123028 A1 | 5/2011 | Karabinis |
| 2011/0142182 A1 | 6/2011 | Gu |
| 2011/0143700 A1 | 6/2011 | Lagunas Hernandez et al. |
| 2011/0197740 A1 | 8/2011 | Chang et al. |
| 2011/0219423 A1 | 9/2011 | Aad et al. |
| 2011/0222495 A1 | 9/2011 | Li et al. |
| 2011/0228989 A1 | 9/2011 | Burton |
| 2012/0039379 A1 | 2/2012 | Husen et al. |
| 2012/0057651 A1* | 3/2012 | Kim ............................ 375/296 |
| 2012/0099679 A1 | 4/2012 | Yamada et al. |
| 2012/0230449 A1 | 9/2012 | Futatsugi et al. |
| 2013/0308733 A1 | 11/2013 | Kato et al. |

FOREIGN PATENT DOCUMENTS

| | | |
|---|---|---|
| EP | 1 589 712 A2 | 10/2005 |
| GB | 2349544 | 1/2000 |
| JP | H11-215095 | 8/1999 |
| JP | H11-289312 | 10/1999 |
| WO | WO 2005/036790 A1 | 4/2005 |
| WO | WO 2005/046255 | 9/2006 |
| WO | WO 2006/137693 A1 | 12/2006 |
| WO | WO 2007/001707 A2 | 1/2007 |

OTHER PUBLICATIONS

3GPP/LTE Advanced, "3rd Generation Partnership Project: Technical Specification Group Radio Access Network; Evolved Universal Terrestrial Radio Access (E-UTRA); Physical channels and modulation (Release 10)", 3GPP TS 36.211, V10.0.0, Dec. 2010, 103 pp.

Agilent Technologies, "Introducing LTE-Advanced", Application Note, Retrieved from the internet at URL: http://cp.literature.agilent.com/litweb/pdf/5990-6706EN.pdf, Printed in USA, Mar. 8, 2011, 36 pages.

Akan et al. "ATL: An Adaptive Transport Layer Suite for Next-Generation Wireless Internet", IEEE Journal on Selected Areas in Communications, vol. 22, No. 5, Jun. 2004, 802-817.

Akyildiz et al. "AdaptNet: An Adaptive Protocol Suite for the Next-Generation Wireless Internet", IEEE Communications Magazine, Mar. 2004, 128-136.

Akyildiz et al. "Wireless mesh networks: a survey", Computer Networks, vol. 47 (4), 2005, 445-487.

Benvenuto et al., "On the Comparison Between OFDM and Single Carrier Modulation With a DFE Using a Frequency-Domain Feedforward Filter", IEEE Transactions on Communications, vol. 50, No. 6, Jun. 2002, pp. 947-955.

Brodersen et al. "CORVUS: A Cognitive Radio Approach for Usage of Virtual Unlicensed Spectrum", Berkeley Wireless Research Center (BWRC), White Paper, 2004, 21 pp.

Brüninghaus et al., "Multi-Carrier Spread Spectrum and Its Relationship to Single Carrier Transmission", $48^{th}$ IEEE Vehicular Technology Conference, Ottawa, Ontario, vol. 3, May 18-21, 1998, pp. 2329-2332.

Buddhikot et al. "DIMSUMNet: New Directions in Wireless Networking Using Coordinated Dynamic Spectrum Access", Proceedings of the Sixth IEEE International Symposium on a World of Wireless Mobile and Multimedia Networks (WoWMoM '05), 2005, 8 pp.

Cabric et al. "A Cognitive Radio Approach for Usage of Virtual Unlicensed Spectrum", Proceedings of the $14^{th}$ IST Mobile and Wireless Communications Summit, Jun. 2005, 5 pp.

Cabric et al, "Implementation Issues in Spectrum Sensing for Cognitive Radios", Proc. $38^{th}$ Asilomar Conference on Signals, Systems and Computers, Nov. 2004, 772-776.

Carroll "Chaotic communications that are difficult to detect" Physical Review E 67(2):26207-1-26207-6 (2003).

Charalabopoulos et al. "Pre- post- and balanced equalization in OFDM", Vehicular Technology Conference, 2003. VTC 2003-Fall. 2003 IEEE $58^{th}$ Orlando, FL, USA; Oct. 6-9, 2003; Piscataway, NJ USA, IEEE, US, vol. 5, Oct. 6, 2003, pp. 3145-3148.

Dahlman E. et al. "3G Evolution HSPA and LTE for Mobile Broadband", 2008, Elsevier Ltd., Oxford US, pp. 383-387.

Dahlman E. et al., 3G Evolution: HSPA and LTE for Mobile Broadband—2d Edition, (Burlington, MA: Academic Press, 2008), Chapter 4, pp. 43-64.

Dahlman, "3G long-term evolution", Telefon AB LM Ericsson, 2005, 36 pp.

DARPA XG Working Group, "The XG Architectural Framework, Request for Comments, V1.0", Prepared by BBN Technologies, Cambridge, MA, US, Jul. 2003, 16 pp.

DARPA XG Working Group, "The XG Vision, Request for Comments, V2.0", Prepared by BBN Technologies, Cambridge MA, US, Jan. 2004, 17 pp.

Digham et al. "On the Energy Detection of Unknown Signals over Fading Channels", Proc. IEEE ICC 2003, vol. 5, May 2003, 3575-3579.

Dinis et al., "A Multiple Access Scheme for the Uplink of Broadband Wireless Systems", IEEE Global Telecommunications Conference, Nov. 29-Dec. 3, 2004, vol. 6, pp. 3808-3812.

Dollard P.M. "On the time-bandwidth concentration of signal functions forming given geometric vector configurations", IEEE Transactions on Information Theory, Oct. 1964, pp. 328-338.

Ekström et al., "Technical Solutions for the 3G Long-Term Evolution", IEEE Communications Magazine, vol. 44, No. 3, Mar. 2006, pp. 38-45.

Esteves "The High Data Rate Evolution of the cdma2000 Cellular System", Appeared in Multiaccess, Mobility and Teletraffic for Wireless Communications, vol. 5, Kluwer Academic Publishers, 2000, pp. 61-72.

Falconer et al., "Frequency Domain Equalization for Single-Carrier Broadband Wireless Systems", IEEE Communications Magazine, vol. 40, No. 4, Apr. 2002, pp. 58-66.

Federal Communications Commission, FCC 03-289, Notice of Inquiry and Notice of Proposed Rulemaking, Nov. 2003, 31 pp.

Federal Communications Commission, FCC 03-322, Notice of Proposed Rule Making and Order, Dec. 2003, 53 pp.

Galda et al., "A Low Complexity Transmitter Structure for OFDM-FDMA Uplink Systems" IEEE $55^{th}$ Vehicular Technology Conference, 2002, vol. 4, May 2002, pp. 1737-1741.

Gardner "Signal Interception: A Unifying Theoretical Framework for Feature Detection" IEEE Transactions on Communications 36(8):897-906 (1988).

Gessner et al., "LTD technology and LTE test; a deskside chat", Rohde & Schwarz, Apr. 2009, 92 pp.

Grandblaise et al. "Dynamic Spectrum Allocation (DSA) and Reconfigurability", Proceeding of the SDR 02 Technical Conference and Product Exposition, Nov. 2002, 6 pp.

Haykin "Cognitive Radio: Brain-Empowered Wireless Communications", IEEE Journal on Selected Areas in Communications, vol. 23, No. 2, Feb. 2005, 201-220.

(56) References Cited

OTHER PUBLICATIONS

Haykin, S., *Adaptive Filter Theory*, 1986, Prentice-Hall, pp. 173,301,497.
Hillenbrand et al. "Calculation of Detection and False Alarm Probabilities in Spectrum Pooling Systems", *IEEE Communications Letters*, vol. 9, No. 4, Apr. 2005, 349-351.
Holma et al. "LTE for UMTS—OFDMA and SC-FDMA Based Radio Access" 2009, John Wiley & Sons, Ltd., Chichester UK, pp. 76-82.
Horne "Adaptive Spectrum Access: Using the Full Spectrum Space", *Proc. Telecommunications Policy Research Conference (TPRC)*, Sep. 2003, 15 pp.
Hoven et al., "Some Fundamental Limits on Cognitive Radio", PowerPoint presentation, Wireless Foundations, EECS, University of California at Berkeley, Feb. 11, 2005, 16 pp.
International Preliminary Report on Patentability, PCT International Application No. PCT/US09/01152, Nov. 8, 2010.
International Search Report and Written Opinion, PCT International Application No. PCT/US2009/003495, Nov. 26, 2009.
Invitation to Pay Additional Fees corresponding to International Application No. PCT/US2010/029028; Date of Mailing: Jan. 28, 2011; 11 pages.
Ishii, "Draft2 Report of 3GPP TSG RAN WG1 #40bis in Beijing (Beijing, China, Apr. 4-8, 2005)", R1-050376, Agenda Item 3, 3GPP TSG RAN WG1 Meeting #41, Athens, Greece, May 9-13, 2005, 65 pp.
Ixia "SC-FDMA Single Carrier FDMA in LTE" White Paper, Rev. A, Nov. 2009, 16 pp.
Jondral "Software-Defined Radio-Basics and Evolution to Cognitive Radio", *EURASIP Journal on Wireless Communications and Networking*, 2005:3, 275-283.
Jungnickel V. et al., "Synchronization of Cooperative Base Stations", *IEEE International Symposium on Wireless Communications Systems*; Oct. 21-24, 2008, 6 pages.
Kanodia et al. "MOAR: A Multi-channel Opportunistic Auto-rate Media Access Protocol for Ad Hoc Networks", *Proceedings of the First International Conference on Broadband Networks (BROADNETS '04)*, Oct. 2004, 600-610.
Karabinis "Increased Capacity Communications for OFDM-Based Wireless Communications Systems/Methods/Devices", U.S. Appl. No. 12/748,931, filed Mar. 29, 2010.
Landau H.J. & Pollak H.O., "Prolate spheroidal wave functions, Fourier analysis and uncertainty—III: The dimension of the space of essentially time- and band-limited signals", Bell System Technical Journal, 41, pp. 1295-1336, Jul. 1962.
Leaves et al. "Dynamic Spectrum Allocation in Composite Reconfigurable Wireless Networks", *IEEE Communications Magazine*, vol. 42, May 2004, 72-81.
Lim et al., "Channel-Dependent Scheduling of Uplink Single Carrier FDMA Systems" *IEEE 64th Vehicular Technology Conference*, Montreal, Quebec, Sep. 25-28, 2006, pp. 1-5.
Mietzner et al. "Multiple-antenna techniques for wireless communications—a comprehensive literature survey", IEEE Communications Surveys, IEEE, New York, NY, US; vol. 11, No. 2, Apr. 1, 2009, pp. 87-105.
Mitola III "Cognitive Radio for Flexible Mobile Multimedia Communications", *IEEE International Workshop on Mobile Multimedia Communications (MoMuC)*, Nov. 1999, 3-10.
Mitola III et al. "Cognitive Radio: Making Software Radios More Personal", *IEEE Personal Communications*, vol. 6, Issue 4, Aug. 1999, 13-18.
Mitola III, Dissertation "Cognitive Radio—An Integrated Agent Architecture of Software Defined Radio", Royal Institute of Technology, May 8, 2000, 313 pp.
Motorola, "R1-050971 Single Carrier Uplink Options for E-UTRA: IFDMA/DFT-SOFDM Discussion and Initial Performance Results", 3GPP TSG RAN WG1 #42, London, United Kingdom, Agenda Item: 10.3, Aug. 29-Sep. 2, 2005, 30 pp.
Motorola, "Uplink Numerology and Frame Structure", 3GPP TSG RAN1#41 Meeting, Athens, Greece, Agenda Item 13.2, May 9-13, 2005, 10 pp.
Murty R. "Software-defined reconfigurability radios: smart, agile, cognitive, and interoperable", downloaded Nov. 12, 2013 from http://www.siliconinvestor.com/readmsg.aspx?msgid-19066134, 4 pp.
Myung et al., "Single Carrier FDMA for Uplink Wireless Transmission", *IEEE Vehicular Technology Magazine*, Sep. 2006, pp. 30-38.
Nedic, Slobodan et al. "Per-Bin DFE for Advanced OQAM-based Multi-Carrier Wireless Data Transmission Systems." *2002 International Zurich Seminar on Broadband Communications Access—Transmission—Networking*. (2002): 38-1-38-6. Print.
Nokia, "Uplink Considerations for UTRAN LTE", 3GPP TSG RAN WG1 #40bis, Beijing, China, R1-050251, Agenda Item 12.2.1, Apr. 4-8, 2005, 8 pp.
Notification of Transmittal of the International Search Report and the Written Opinion of the International Searching Authority, or the Declaration, International Search Report, Written Opinion of the International Searching Authority, PCT Application No. PCT/US2009/001152, May 7, 2009.
Price R. et al., "A Communication Technique for Multipath Channels", *Proceedings of the IRE*, 1958, vol. 46, pp. 555-570.
Proakis, Digital Communications, McGraw-Hill Book Company, 1983, pp. 580-583.
Proakis, John G. *Digital Communications*, 1983, McGraw-Hill, pp. 479.
Rumney, "3GPP LTE: Introducing Single-Carrier FDMA", *Agilent Measurement Journal*, Jan. 1, 2008, 10 pp.
Sahai et al. "Some Fundamental Limits on Cognitive Radio", *Allerton Conf. on Commun., Control and Computing*, Oct. 2004, 11 pp.
Sari et al., "Transmission Techniques for Digital Terrestrial TV Broadcasting", *IEEE Communications Magazine*, vol. 33, No. 2, Feb. 1995, pp. 100-109.
Schilling D.L. et al., "Optimization of the Processing Gain on an M-ary Direct Sequence Spread Spectrum communication System", *IEEE Transactions on Communications*, vol. Com-28, No. 8, Aug. 1980, pp. 1389-1398.
Song et al. "Cross-Layer Optimization for OFDM Wireless Networks—Part II: Algorithm Development", *IEEE Transactions on Wireless Communications*, vol. 4, No. 2, Mar. 2005, pp. 625-634.
Sorger et al., "Interleaved FDMA—A New Spread-Spectrum Multiple-Access Scheme", *IEEE International Conference on Communications*, vol. 2, Jun. 7-11, 1998, pp. 1013-1017.
Taub and Schilling, Principles of Communication Systems, Second Edition, McGraw-Hill Publishing Company, 1986, pp. 729-732.
Torrieri, Principles of Military Communication Systems, Artech, 1981, pp. 65-67.
Tran, Thien-Toan et al., "Overview of enabling technologies for 3GPP LTE-advanced", *EURASIP Journal on Wireless Communications and Networking*, 2012, vol. 54, 12 Pages.
U.S. Appl. No. 60/692,932, filed Jun. 22, 2005, Peter D. Karabinis, "Communications systems, methods, devices and computer program products for low probability of intercept (PLI), low probability of detection (LPD) and/or low probability of exploitation (LPE) of communications information".
U.S. Appl. No. 60/698,247, filed Jul. 11, 2005, Peter D. Karabinis, "Additional communications systems, methods, devices and/or computer program products for low probability of intercept (PLI), low probability of detection (LPD) and/or low probability of exploitation (LPE) of communications information and/or minimum interference communications".
U.S. Appl. No. 61/033,114, filed Mar. 3, 2008, Peter D. Karabinis, "Next Generation (Xg) Chipless Spread-Spectrum Communications (Cssc)".
Weiss et al. "Efficient Signaling of Spectral Resources in Spectrum Pooling Systems", *Proceedings of the 10th Symposium on Communications and Vehicular Technology (SCVT)*, Nov. 2003, 6 pp.
Weiss et al. "Spectrum Pooling: An Innovative Strategy for the Enhancement of Spectrum Efficiency", *IEEE Radio Communications Magazine*, 2004, 8-14.
Widrow B., Stearns S.D., *Adaptive Signal Processing*, 1985, Prentice-Hall, Inc., pp. 183.

(56) References Cited

OTHER PUBLICATIONS

Wikipedia contributors, "Orthogonal frequency-division multiplexing," *Wikipedia, The Free Encyclopedia*, http://en.wikipedia.org/w/index.php?title=Orthogonal_frequency-division_multiplexing&oldid=489673844 (accessed Apr. 25, 2012).
Xu et al. "DRiVE-ing to the Internet: Dynamic Radio for IP Services in Vehicular Environments", *Proceedings of the 25th Annual IEEE Conference on Local Computer Networks*, Nov. 2000, 281-289.
Zhang et al., "A Novel Direct Waveform Synthesis Technique With Carrier Frequency Programmable", *IEEE Wireless Communications and Networking Conference*, 2002, pp. 150-154.
Zhang H. et al., "Base Station Cooperation for Multiuser MIMO: Joint Transmission and BS Selection", *2004 Conference on Information Sciences and Systems, Princeton University*, Mar. 17-19, 2004, 6 pages.
Zheng et al. "Collaboration and Fairness in Opportunistic Spectrum Access", *Proceedings IEEE ICC 2005*, vol. 5, May 2005, 3132-3136.
Ziemer and Peterson, Digital Communications and Spread Spectrum Systems, Macmillan Publishing Company, 1985, pp. 348-349.
IEEE Standard 802.11a-1999, "Supplement to IEEE Standard for Information Technology—Telecommunications and Information exchange between systems—Local and metropolitan area networks—Specific Requirements—Part 11: Wireless LAN Medium Access Control (MAC) and Physical Layer (PHY) specifications: High Speed Physical Layer in the 5 GHz Band", Dec. 30, 1999, 91 pp.
Haykin, S., *Communications Systems*, John Wiley & Sons, Inc., pp. 550-556.
Taub and Schilling, *Principles of Communication Systems, Second Edition*, McGraw-Hill Publishing Company, 1986, pp. 276-286.
Wikipedia, the free encyclopedia, "Discrete-time signal", downloaded Apr. 27, 2015 from http://en.wikipedia.org/w/index.php?title=Discrete-time_signal&printable=yes, 3 pp.
Wikipedia, the free encyclopedia, "Bandwidth (signal processing)", downloaded Apr. 27, 2015 from http://en.wikipedia.org/w/index.php?title=Bandwidth_(signal_processing)&printable=yes, 5 pp.
U.S. Appl. No. 60/659,794, filed Mar. 9, 2005, Evans et al. (ATC Technologies/LightSquared).
U.S. Appl. No. 60/672,575, filed Apr. 19, 2005, Palanki (Qualcomm).
U.S. Appl. No. 60/691,755, filed Jun. 16, 2005, Palanki (Qualcomm).
3GPP TR 25.892 v.1.1.0, "3rd Generation Partnership Project: Technical Specification Group Radio Access Network; Feasibility Study for OFDM for UTRAN enhancement; (Release 6)," 3GPP TR 25.892 v.1.1.0 (Mar. 2004).
3GPP TS 36.101 version 1.0.0 (Dec. 11, 2007).
3GPP TS 36.101 version 8.1.0 (Dec. 21, 2007) (date indicated on ref is Mar. 2008).
3GPP TS 36.104 version 8.0.0 (Dec. 20, 2007).
3GPP TS 36.104 version 1.0.0 (Dec. 11, 2007).
3GPP TS 36.201 version 0.1.0 (Oct. 16, 2006).
3GPP TS 36.201 version 0.1.1 (Nov. 2, 2006).
3GPP TS 36.201 version 0.2.0 (Nov. 24, 2006).
3GPP TS 36.201 version 1.0.0 (Mar. 19, 2007).
3GPP TS 36.201 version 1.1.0 (Jun. 21, 2007) (date indicated on ref is May 2007).
3GPP TS 36.201 version 1.2.0 (Jul. 10, 2007).
3GPP TS 36.201 version 2.0.0 (Sep. 24, 2007).
3GPP TS 36.201 version 8.0.0 (Sep. 27, 2007).
3GPP TS 36.201 version 8.1.0 (Dec. 11, 2007) (date indicated on reference is Nov. 2007).
3GPP TS 36.211 version 0.0.0 (Oct. 10, 2006) (date indicated on reference is Sep. 2006).
3GPP TS 36.211 version 0.0.1 (Oct. 10, 2006) (if you try to DL ver 0.0.1 you get ver 0.0.0).
3GPP TS 36.211 version 0.1.0 (Oct. 16, 2006).
3GPP TS 36.211 version 0.1.1 (Nov. 8, 2006).
3GPP TS 36.211 version 0.1.2 (Nov. 24, 2006).
3GPP TS 36.211 version 0.2.0 (Nov. 24, 2006).
3GPP TS 36.211 version 0.2.1 (Dec. 11, 2006) (date indicated on reference is Nov. 2006).
3GPP TS 36.211 version 0.2.2 (Jan. 11, 2007) (date indicated on reference is Dec. 2006).
3GPP TS 36.211 version 0.3.1 (Feb. 6, 2007).
3GPP TS 36.211 version 1.0.0 (Mar. 19, 2007).
3GPP TS 36.211 version 1.1.0 (Jun. 21, 2007) (date indicated on reference is May 2007).
3GPP TS 36.211 version 1.2.0 (Jul. 30, 2007) (date indicated on reference is Jun. 2007).
3GPP TS 36.211 version 2.0.0 (Sep. 24, 2007).
3GPP TS 36.211 version 8.0.0 (Sep. 27, 2007).
3GPP TS 36.211 version 8.1.0 (Dec. 20, 2007) (date indicated on reference is Nov. 2007).
3GPP TS 36.212 version 2.0.0 (Sep. 24, 2007).
3GPP TS 36.212 version 8.0.0 (Sep. 27, 2007).
3GPP TS 36.212 version 8.1.0 (Dec. 20, 2007) (Nov. 2007).
3GPP TS 36.212 version 0.0.0 (Oct. 12, 2006).
3GPP TS 36.212 version 0.1.0 (Oct. 16, 2006).
3GPP TS 36.212 version 0.2.0 (Nov. 24, 2006).
3GPP TS 36.212 version 0.2.1 (Dec. 18, 2006) (Nov. 2006).
3GPP TS 36.212 version 1.0.0 (Mar. 19, 2007).
3GPP TS 36.212 version 1.2.0 (Jun. 21, 2007) (May 2007).
3GPP TS 36.212 version 1.3.0 (Jul. 30, 2007).
3GPP TS 36.213 version 0.1.1 (Jan. 16, 2007) (date indicated on ref is Oct. 2006).
3GPP TS 36.213 version 2.1.0 (Sep. 24, 2007).
3GPP TS 36.213 version 0.1.0 (Oct. 16, 2007).
3GPP TS 36.213 version 0.2.0 (Jan. 3, 2006).
3GPP TS 36.213 version 0.2.1 (Feb. 7, 2007).
3GPP TS 36.213 version 1.0.0 (Mar. 19, 2007).
3GPP TS 36.213 version 1.2.0 (Jun. 21, 2007) (May 2007).
3GPP TS 36.213 version 2.0.0 (Sep. 24, 2007).
3GPP TS 36.213 version 8.0.0 (Sep. 27, 2007).
3GPP TS 36.213 version 8.1.0 (Dec. 20, 2007) (Nov. 2007).
3GPP TS 36.321 version 1.0.0 (Sep. 24, 2007).
3GPP TS 36.321 version 1.1.0 (Dec. 18, 2014).
3GPP TS 36.321 version 2.0.0 (Dec. 11, 2007) (Nov. 2007).
3GPP TS 36.321 version 8.0.0 (Dec. 20, 2007).
"Universal Mobile Telecommunications System (UMTS); UMTS Terrestrial Radio Access (UTRA); Concept evaluation (UMTS 30.06 version 3.0.0)" (Dec. 1997).
Abel Sanchez Nunez, "Interference Suppression in Multiple Access Communications Using M-ary Phase Shift Keying Generated Via Spectral Encoding," Department of the Air Force, Air Force Institute of Technology, Master's Thesis (Mar. 2004).
Alcatel et al., "Principles for the Evolved UTRA radio-access concept," 3GPP TSG-RAN WG1 meeting R1-ah-24944 Ad Hoc on LTE, Sophia Antipolis, France (Jun. 16, 2005).
Anader Benyamin-Seeyar et al., "Draft Document for SC-FDE PHY Layer System for Sub 11 GHz BWA," IEEE 802.16 Broadband Wireless Access Working Group (May 9, 2001).
Andreas Bury and Jurgen Lindner, "Comparison of amplitude distributions for Hadamard spreading and Fourier spreading in multi-carrier code division multiplexing," Global Telecommunications Conference, 2000 (GLOBECOM '00).
Andren C. "LPI Radio Communications IR&D Project," GOLPIE Conference Paper (1991).
Askar et al., "Spectral Keying™: A Novel Modulation Scheme for UWB Systems," 2003.
Behzad Razavi, "RF Microelectronics," Prentice-Hall, 1998.
Bingham, "Multicarrier Modulation for Data Transmission: An Idea Whose Time Has Come," 1990.
Chang "Synthesis of Band-Limited Orthogonal Signals for Multichannel Data Transmission," 1966.
Cho, "A Novel Frequency-Hopping Spread-Spectrum Multiple-Access Network Using M-ary Orthogonal Walsh Sequence Keying," Nov. 2003.
Choi, "Maximum Throughput of FHSS Multiple-Access Networks Using MFSK Modulation," Apr. 2004.
Daly "Efficient Multi-Carrier Communication on the Digital Subscriber Loop", 2003.
David Falconer and Stefan Kaiser, "Broadband Frequency Domain-Based Air Interfaces for Future—Generation Wireless Systems," Wireless World Research Forum (Feb. 2005).

(56) References Cited

OTHER PUBLICATIONS

Dirk Galda and Hermann Rohling, "A Low Complexity Transmitter Structure for OFDM-FDMA Uplink Systems," IEEE Vehicular Technology Conference (VTC), Spring 2002.
Dirk Galda et al., "Broadband OFDM-FDMA System for the Uplink of a Wireless LAN," The Third IEEE Workshop on Wireless LANs, Newton, Massachusetts (Sep. 27-28, 2001).
Eklund "IEEE Standard 802.16: A Technical Overview of the WirelessMAN Air Interface for Broadband Wireless Access", 2002.
Ericsson et al., "Basic principles for the Evolved UTRA radio access concept," 3GPP TSG-RAN WG1 meeting R1-41, Athens, Greece (May 3, 2005).
Ericsson, "Evolved UTRA: Uplink Transmission Scheme," 3GPP TSG-RAN WG1 meeting R1#40bis, Beijing, China (Mar. 31, 2005).
Falconer et al., "Frequency Domain Equalization for Single-Carrier Broadband Wireless Systems," pp. 58-66, IEEE Communication Magazine (Apr. 2002).
Golpie III Letter to Harris Corporation, Mar. 30, 1991, 3 pages.
Han Vinck, "Coded modulation for power line communications," 2000.
Han Vinck, "Coding and Modulation for Power-Line Communications," 2000.
Han Vinck, "On Coded M-ary Frequency Shift Keying," Mar. 2004.
Huawei, "EUTRA uplink concept: Text proposal for Section 9 in the TR 'Physical Layer Aspect for Evolved UTRA,'" 3GPP TSG-RAN WG1 meeting R1-ah-24944 Ad Hoc on LTE, Sophia Antipolis, France (Jun. 16, 2005).
Hyung G. Myung, Junsung Lim, and David J. Goodman, "Single Carrier FDMA for Uplink Wireless Transmission," IEEE Vehicular Technology Magazine (Sep. 2006).
IEEE 802.16 (2001).
IEEE 802.16 (2004).
Itoh, "Spread spectrum communication via chaos," 1999.
Jiang, Performance analysis of FFH/MFSK receivers with selfnormalization combining in the presence of multitone jamming, 2002.
John G. Proakis, "Digital Communications," Fourth Edition, McGraw Hill (2000).
Joseph J. Carr, "The Technician's Radio Receiver Handbook," Butterworth-Heinemann, 2001 ("Carr 2001").
K. Fazel and S. Kaiser, "Multi-Carrier and Spread Spectrum Systems", John Wiley & Sons, 2003.
Karsten Bruninghaus and Hermann Rohling, "Multi-Carrier Spread Spectrum and Its Relationship to Single-Carrier Transmission", Vehicular Technology Conference (1998).
Kennedy and Kolumban, "Digital communications using chaos," 2000.
Kennedy, "Communicating with Chaos," 2000.
Kobayashi, H., Fukuhara, T., Yuan, H., & Takeuchi, Y. (Apr. 2003). Proposal of single carrier OFDM technique with adaptive modulation method. In Vehicular Technology Conference, 2003. VTC 2003—Spring. The 57th IEEE Semiannual (vol. 3, pp. 1915-1919).
Koffman et al. IEEE Communications Magazine "Broadband Wireless Access Solutions Based on OFDM Access in IEEE 802.16", 2002.
Kolumban et al., "Chaotic Communications With Correlator Receivers: Theory and Performance Limits," 2002.
Kolumban et al., "Optimum noncoherent fm-dcsk detector: application of chaotic GML decision rule," 2004.
Kolumban et al., "The Role of Synchronization in Digital Communications Using Chaos—Part I: Fundamentals of Digital Communications," 1997.
Kolumban et al., "The Role of Synchronization in Digital Communications Using Chaos-Part II: Chaotic Modulation and Chaotic Synchronization," Nov. 1998.
Kolumban et al., The Role of Synchronization in Digital Communications Using Chaos—Part III: Performance Bounds for Correlation Receivers, Dec. 2000.
Krol, "An Experimental FM-DCSK Chaos Radio System," 2001.
Leon W. Couch "Modern Communication Systems, Modern Communication Systems Principles and Applications," Prentice-Hall (1995).
LG Electronics, "PAPR comparison of uplink MA schemes," 3GPP TSG RAN WG1 Meeting #41, Athens, Greece (May 9-13, 2005).
Mandal, "A Chaos-based Spread Spectrum Communication System," 2003.
Motorola, "EUTRA Uplink Numerology and Design," 3GPP TSG-RAN WG1 meeting R1-ah-24944 Ad Hoc on LTE, Sophia Antipolis, France (Jun. 16, 2005).
Motorola, "Uplink Multiple Access for EUTRA," 3GPP TSG RAN1#40bis Meeting (Apr. 2005).
Motorola, "Uplink Numerology and Frame Structure," 3GPP TSG-RAN WG1 meeting R1-41, Athens, Greece (May 3, 2005).
Myung, "Single Carrier Orthogonal Multiple Access Technique for Broadband Wireless Communications," Ph.D Thesis, The Polytechnic University, Jan. 2007.
Nec et al., "Uplink Multiple Access for Evolved UTRA," 3GPP TSG-RAN WG1 meeting R1-40bis Beijing, China (Mar. 30, 2005).
Nokia, "Uplink Multiple Access Consideration With the Use of FDMA," 3GPP TSG-RAN WG1 meeting R1-41, Athens, Greece (May 3, 2005).
NTT DoCoMo et al., "Radio Parameter Set for Single-Carrier Based Radio Access in Evolved UTRA Uplink," 3GPP TSG-RAN WG1 meeting R1-ah-24944 Ad Hoc on LTE, Sophia Antipolis, France (Jun. 16, 2005).
NTT DoCoMo et al., "Views on OFDM Parameter Set for Evolved UTRA Downlink," 3GPP TSG-RAN WG1 meeting R1-41, Athens, Greece (May 3, 2005).
NTT DoCoMo, "Physical Channels and Multiplexing in Evolved UTRA Downlink," 3GPP TSG-RAN WG1 meeting R1-ah-24944 Ad Hoc on LTE, Sophia Antipolis, France (Jun. 16, 2005).
NTT DoCoMo, "Physical Channels and Multiplexing in Evolved UTRA Uplink," 3GPP TSG-RAN WG1 meeting R1-ah-24944 Ad Hoc on LTE, Sophia Antipolis, France (Jun. 16, 2005).
NTT DoCoMo, "Uplink Multiple Access Scheme for Evolved UTRA," 3GPP TSG-RAN WG1 meeting R1#40bis, Beijing, China (Mar. 30, 2005).
Orr et al., "Transform-based low probability of intercept communications," 2002.
Orr et al., "Wavelet transform domain communication systems," 1995.
Park and Lee, "Iterative Decoding in Convolutionally and Turbo Coded MFSK/FH-SSMA Systems," 2001.
Patrick J. Swackhammer, Michael A. Temple, Richard A. Raines, "Performance Simulation of a Transform Domain Communication System for Multiple Access Applications," Military Communications Conference Proceedings, Oct. 31, 1999-Nov. 3, 1999 (MILCOM 1999).
Richard F Ormondroyd et al., "Spectrally Shaped Random-Phase Spreading Functions for Robust Wide-Bandwidth Communications," Communications and Wireless Networks Group, Department of Aerospace, Power and Sensors, Cranfield University (Oct. 24, 2003).
Richard Van Nee and Ramjee Prasad, "OFDM for Wireless Multimedia Communications," Artech House (2000).
Rui Dinis, David Falconer, Chan Tong Lam, and Maryam Sabbaghian, "A Multiple Access Scheme for the Uplink of Broadband Wireless Systems," IEEE Communications Society, GLOBECOM 2004.
Samsung "Uplink Multiple Access and Multiplexing for Evolved UTRA," 3GPP TSG-RAN WG1 meeting R1-41, Athens, Greece (May 3, 2005).
Samsung, "Uplink Transmission and Multiplexing for EUTRA," 3GPP TSG-RAN WG1 meeting R1-ah-24944 Ad Hoc on LTE, Sophia Antipolis, France (Jun. 16, 2005).
Skehill et al. "Overview of Wi-Max IEEE 802.16", 2005.
Sklar, "Defining, Designing, and Evaluating Digital Communication Systems," 1993.
Tatsumoto, "Performance Analysis of RS-Coded Wary FSK for Frequency—Hopping Spread Spectrum Mobile Radios," Aug. 1992.
Tennenhouse et al. "SpectrumWare—A Software-Oriented Approach to Wireless Signal Processing," 1995.

(56) References Cited

OTHER PUBLICATIONS

Tennenhouse et al. "The SpectrumWare Testbed for ATM-based Software Radios," 1996.
Vaidyanathan, IEEE Transactions on Circuits and Systems, "Discrete Multitone Modulation With Principal Component Filter Banks," 2002.
Weinstein "Data Transmission by Frequency-Division Multiplexing Using the Discrete Fourier Transform", 1971.
Welborn "Direct waveform synthesis for software radios," IEEE 1999.
Welborn et al. "Flexible Signal Processing Algorithms for Wireless Communications," Ph.D. Thesis, MIT Jun. 2000.
Welborn et al. "Waveform Synthesis for transmission of complex waveforms," IEEE 1999.
Yaghoobi et al. Intel Technology Journal, "Scalable OFDMA Physical Layer in IEEE 802.16 WirelessMAN", vol. 8, Issue 3, 2004.
Yang et al., "Overlapping M-ary Frequency Shift Keying Spread-Spectrum Multiple-Access Systems Using Random Signature Sequences," Nov. 1999.
Yuanrun Teng, Kazuo Mori, Hideo Kobayashi, "Proposal of SDM-SCOFDM System with Adaptive Modulation Method over MIMO Channels," IEICE Trans. Commun. vol. E87-B, No. 9 Sep. 1, 2004.
Zhang et al. "A Novel Direct Waveform Synthesis Technique With Carrier Frequency Programmable", IEEE 2002.
Zhang et al., "Narrowband Waveform Design for Near-Far Resistant Asynchronous CDMA Communications," pp. 583-87 vol. 2, Military Communications Conference (Oct. 1994).
Auer et al. "Feasibility of multi-bandwith transmissions" *IST-2003-507581 Winner*D2.2 v1.1 (50 pages) (2004).
Beach et al. "Software Defined Radio" *John Wiley & Sons, Ltd.*(428 pages) (2002).
Benko et al. "IEEE P802.22 Wireless RANs"*A PHY/MAC Proposal for IEEE*802.22 WRAN Systems (81 pages) (Feb. 2006).
Cabric et al. "Implementation Issues in Spectrum Sensing for Cognitive Radios" *Proc. of 38th Asilomar Conference on Signals, Systems and Computers*2004 (5 pages) (Nov. 2004).
Chang et al. "IEEE 802.22 WRAN Merger Framework" IEEE 802.00-060030r4 (247 pages) (Mar. 2006).
Chakravarthy et al. "Cognitive Radio—An Adaptive Waveform with Spectral Sharing Capability" *IEEE Communications Society*/WCNC 2005 725-729 (2005).
Cordes et al. "Synchronization in ADSL Modems" *Master Thesis: Department of Automatic Control, Lund Institute of Technology*(53 pages) (Dec. 1998).
Daly, Donnacha "Efficient Multi-Carrier Communication on the Digital Subscriber Loop" *A thesis presented to the National University of Ireland Faculty of Engineering and Architecture in fulfillment of the requirements for the degree of Doctor of Philosophy*(185 pages) (May 2003).
Dillinger et al. "Software Defined Radio: Architectures, Systems and Functions" *Wiley Series in Software Radio*(465 pages) (2003).
Demestichas et al. "Cognitive Radio, Spectrum and Radio Resource Management" *Wireless World Research Forum*Working Group 6 White Paper (69 pages) (2004).
Falconer et al. "Feasibility of Multi-Bandwidth Transmission in Future Broadband Wireless Systems" $14_{th}$ *IST Mobile & Wireless Communications Summit*(5 pages) (2005).
Fazel et al. "Multi-Carrier and Spread Spectrum Systems: Form OFDM and MC-CDMA to LTE and WiMAX" *John Wiley & Sons, Ltd.*(Second Edition) (380 pages) (2003).
Haker, Marshall E. "Hardware Realization of a Transform Domain Communication System" *Department of the Air Force, Air University, Air Force Institute of Technology Thesis*(102 pages) (2007).
Hickling et al. "Practical Evolution of True Software Definable Radio" *Proceeding of the SDR 04 Technical Conference and Product Exposition*(6 pages) (2004).
Ikanos Communications, Inc. "The Benefits of Discrete Multi-Tone (DMT) Modulations for VDSL Systems" www.ikanos.com (18 pages) (2008).

Jondral, Friedrich K. "Software-Defined Radio—Basics and Evolution to Cognitive Radio" *EURASIP Journal on Wireless Communications and Networking*3:275-283 (2005).
Kittipiyakul et al. "Subcarrier Allocation in OFDMA Systems: Beyond water-filling" *Conference Record of the Thirty-Eighth Asilomar Conference on Signals, Systems and Computers*(6 pages) (2004).
Kivnac et al. "Computationally Efficient Bandwidth Allocation and Power Control for OFDMA"*IEEE Transactions on Wireless Communications*2(6):1150-1158 (2003).
Milošević, Miloš "Maximizing Data Rate of Discrete Multitone Systems using Time Domain Equalization Design" *Dissertation Presented to the Faculty of the Graduate School of The University of Texas Austin*(193 pages) (May 2003).
Mitola, Joseph "Software Radio Architecture Evolution: Foundations, Technology Tradeoffs, and Architecture Implications" *IEICE Transactions on Communications*E38-(6):1165-1173 (Jun. 2000).
Nolan et al. "Interference avoidance dynamic adaptive OFDM using a reconfigurable radio platform" *The 7th IFIP International Conference on Mobile and Wireless Communications Networks*(7 pages) (Sep. 2005).
Olivieri et al. "A Scalable Dynamic Spectrum Allocation System With Interference Mitigation For Teams Of Spectrally Agile Software Defined Radios" *First IEEE International Symposium on New Frontiers in Dynamic Spectrum Access Networks*(10 pages) (2005).
Proakis et al. "Digital Signal Processing: Principals, Algorithms, and Applications" *Third Edition*(336 pages) (1996).
Starr et al. "DSL Advances" (Chapters 1-17) (585 pages) (2003).
U.S. Appl. No. 60/648,337 (13 pages) (filed Jan. 28, 2005).
Vaidyanathan et al. "Discrete Multitone Modulation with Principal Component Filter Banks"*IEEE Transactions on Circuits and Systems—I: Fundamental Theory and Applications*49(10):1397-1412 (Oct. 2002).
Vaidyanathan, P. P. "Filter Banks in Digital Communications" *IEEE Circuits and Systems Magazine*1(2) Second Quarter:4-25 (2001).
Weinstein et al. "Data Transmission by Frequency-Division Multiplexing Using the Discrete Fourier Transform" *IEEE Transactions on Communication Technology*COM-19(5):628-634 (1971).
Weiss et al. "Spectrum Pooling: An Innovative Strategy for the Enhancement of Spectrum Efficiency" *IEEE Radio Communications*Magazine 42:S8-S14 (Mar. 2004).
Letter re: Golpe III to Harris Corporation, National Security Agency, Mar. 30, 1991 (3 pages).
United States Provisional U.S. Appl. No. 60/672,575, Palanki (6 pages) (filed Apr. 19, 2005).
IEEE 802.16 (Revision of IEEE Std 802.16-2001), IEEE Standard for Local and metropolitan area networks; Part 16: Air Interface for Fixed Broadband Wireless Access Systems, *IEEE Standards*(2004) (895 pages).
Koffman, et al., "Broadband Wireless Access Solutions Based on OFDM Access in IEEE 802.16" *IEEE Communications Magazine*, Apr. 2002, (8 pages).
Yaghoobi, et al., "Scalable OFDMA Physical Layer in IEEE 802.16 WirelessMAN", *Intel Technology Journal*, vol. 8, Issue 3, Aug. 2004 (14 pages).
Skehill, et al., "Overview of Wi-Max IEEE 802.16", *Proceedings of the 5th Annual ICT Information Technology and Telecommunications*, Cork, Oct. 2005 (8 pages).
Eklund, "IEEE Standard 802.16: A Technical Overview of the WirelessMAN Air Interface for Broadband Wireless Access" *IEEE Communications Magazine*, Jun. 2002, (12 pages).
Daly, Donnacha, "Efficient Multi-Carrier Communication on the Digital Subscriber Loop" Thesis, May 2003, (185 pages).
Vaidyanathan, et al., "Discrete Multitone Modulation With Principal Component Filter Banks," *IEEE Transactions On Circuits And Systems*, vol. 49, No. 10, Oct. 2002, (16 pages).
ANSI/IEEE Std. 802.11, Part 11: Wireless LAN Medium Access Control (MAC) and Physical Layer )PHY Specifications (528 pages) (1999 Edition).
Assimakopoulos et al. "XDSL Techniques for Power Line Communications" *International Symposium on Power Line Communications and its Application (ISPLC)*, Kyoto (5 pages) (2003).

(56) References Cited

OTHER PUBLICATIONS

Barry et al. "Overview of Wi-Max IEEE 802.16" Proceedings of the 5th Annual ICT Information Technology and Telecommunications, Cork (8 pages) (Oct. 2005).
Cataldo, Anthony "802.16a tapped for wireless MANs" EE Times (3 pages) (Mar. 31, 2003).
Cheng et al. "Gaussian Multiaccess Channels with ISI: Capacity Region and Multiuser Water-Filling" *IEEE Transactions on Information Theory* 39(3):773-785 (1993).
Cioffi, John M. "A Multicarrier Primer" *ANSI T1E1.4 Committee Contribution* (18 pages) (1991).
Gast, Matthew "802.11® Wireless Networks: The Definitive Guide" (436 pages) (Apr. 2002).
"Hardware Implementation of an 802.11a Transmitter" (pp. 1-29) (2005).
Ho et al. "Broadband Access Using Subcarrier Multiplexing and Asymmetric Digital Subsciber Lines" *International Journal of Communication Systems* 13(2):145-154 (2000).
Ho et al. "A Fiber-to-the-Curb System Based on Subcarrier Multiplexing and Asymmetric Digital Subscriber Lines" (6 pages).
IEEE Std. 802.11, Part 11: Wireless LAN Medium Access Control (MAC) and Physical Layer (PHY) Specifications (650 pages) (2007) (Revision of IEEE Std. 802.11-1999).
IEEE Std. 802.11 "Local and Metropolitan Area Networks—Specific Requirements" (483 pages) (2007).
IEEE Std. 802.11g (Amendment to IEEE Std. 802.11, 1999 Edition) (78 pages) (2003).
IEEE Std. 802.11h (Amendment to IEEE Std. 802.11, 1999 Edition) (75 pages) (2003).
IEEE 802.16 Documents (Official Documents, 2011 and earlier) (pp. 1-58) (date of access Feb. 6, 2016).
IEEE 802.16 Task Group a (pp. 1-9) (date of access Feb. 6, 2016).
"The IEEE 802.16 WirelessMAN Standard for Broadband Wireless Metropolitan Area Networks" *IEEE Computer Society Distinguished Visitors Program* (57 pages) (Apr. 9, 2003).
IEEE 802.16 Broadband Wireless Access Working Group "Media Access Control Layer Proposal for the 802.16.1 Air Interface Specification" (257 pages) (Jul. 7, 2000).
IEEE 802.16 Broadband Wireless Access Working Group "Minutes of 802.16 Session #8 " (22 page) (Aug. 13, 2000).
IEEE 802.16 Broadband Wireless Access Working Group "IEEE Standard 802.16: A Technical Overview of the WirelessMAN™ Air Interface for Broadband Wireless Access" (12 pages) (Jun. 4, 2002).
IEEE Std. 802.16a (Amendment to IEEE Std. 802.16-2001) (318 pages) (2003).
IEEE Std. 802.16e (Amendment and Corrigendum to IEEE Std. 802.16-2004) (864 pages) (2005).
ITU-T G.992.1 "Series G: Transmission Systems and Media, Digital Systems and Networks: Asymmetric digital subscriber line (ADSL) transceivers" (256 pages) (2000).
ITU-T G.992.2 "Series G: Transmission Systems and Media, Digital Systems and Networks: Splitterless asymmetric digital Subscriber line (ADSL) transceivers" (179 pages)(2000).
"Joint Proposal for 802.16.1 MAC" (59 pages) (Jul. 12, 2000).
Kaemarungsi et al. "On the Use of Adaptive OFDM to Preserve Energy in Ad Hoc Wireless Netorks" *Proceeedings of 13th MPRG/Virginia Tech Symposium on Wireless Personal Communications* (12 pages) (2003).
Krongold et al. "Computationally Efficient Optimal Power Allocation Algorithm for Multicarrier Communication Systems" *IEEE Transactions on Communications* 48(1):23-27 (2000).
Lai et al. "Adaptive Trellis Coded MQAM and Power Optimization for OFDM Transmission" *Vehicular Technology Conference* vol. 1:290-294 (1999).
Munz et al. "An Efficient Waterfilling Algorithm for Multiple Access OFDM" *Global Telecommunications Conference* vol. 1:681-685 (2002).
Nolan et al. "OFDM Sub-Carrier Allocation Algorithm for a Multiple User Data Enhanced Radio Server (MUDERS) Using a General Purpose Processor Platform" *Proceeedings of 4th Software Defined Radio (SDR) Forum Technical Conference* (6 pages) (2004).
Oh et al. "Optimum Power Allocation and Control for OFDM in Multiple Access Channels" *Vehicular Technology Conference* vol. 2:774-778 (2004).
Pfletschinger et al. "Efficient Subcarrier Allocation for Multiple Access in OFDM System" *7th International OFDM-Workshop* (5 pages) (2002).
Rhee et al. "Increases in Capacity of Multiuser OFDM System Using Dynamic Subchannel Allocation" *Vehicular Technology Conference Proceedings* vol. 2:1085-1089 (2000).
Shannon, C. E. "A Mathematical Theory of Communication" *The Bell System Technical Journal* 27:379-423, 623-656 (1948).
Song et al. "Adaptive Subcarrier and Power Allocation in OFDM Based on Maximizing Utility" *Vehicular Technology Conference* vol. 2:905-909 (2003).
Starr et al. "Multiuser OFDM with Adaptive Sub-carrier, Bit, and Power Allocation" *IEEE Journal on Selected Areas in Communications* 17(10):1747-1758 (1999).
Yu et al. "Distributed Multiuser Power Control for Digital Subscriber Lines" *IEEE Journal on Selected Areas in Communications* 20(5):1105-1115 (2002).
Zhang et al. "Multiuser Adaptive Subcarrier-and-Bit Allocation With Adaptive Cell Selection for OFDM Systems" *IEEE Transactions on Wireless Communications* 3(5):1566-1575 (2004).

\* cited by examiner

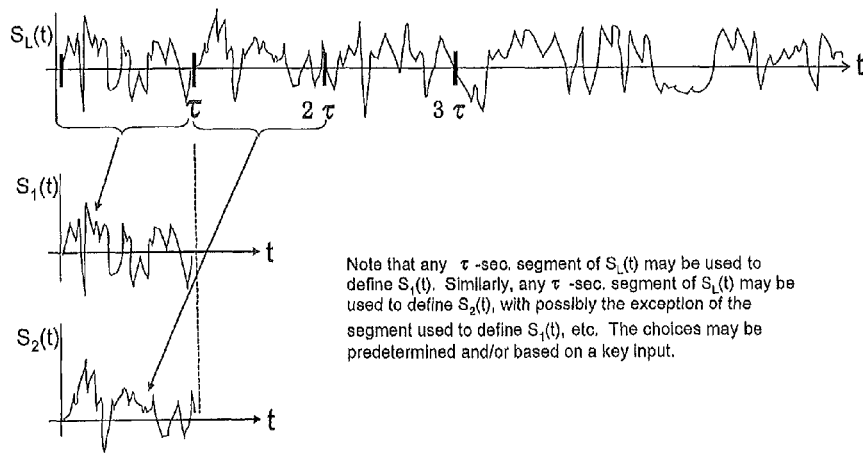

Note that any $\tau$-sec. segment of $S_L(t)$ may be used to define $S_1(t)$. Similarly, any $\tau$-sec. segment of $S_L(t)$ may be used to define $S_2(t)$, with possibly the exception of the segment used to define $S_1(t)$, etc. The choices may be predetermined and/or based on a key input.

Figure 3

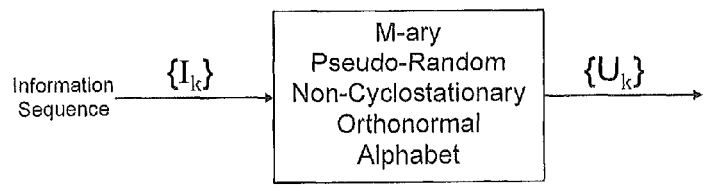

$$I_k \in \{I_1, I_2, \ldots I_M\} \text{ for } \forall k$$

$$U_k \in \{U_1, U_2, \ldots, U_M\}$$

$$\{I_k\} = \sum_k I_k \, \delta(t - k\tau)$$

or $$\{I_k\} = \sum I_k \, \delta(t - \tau_k)$$

$\tau_k$ — Random variable

Figure 4

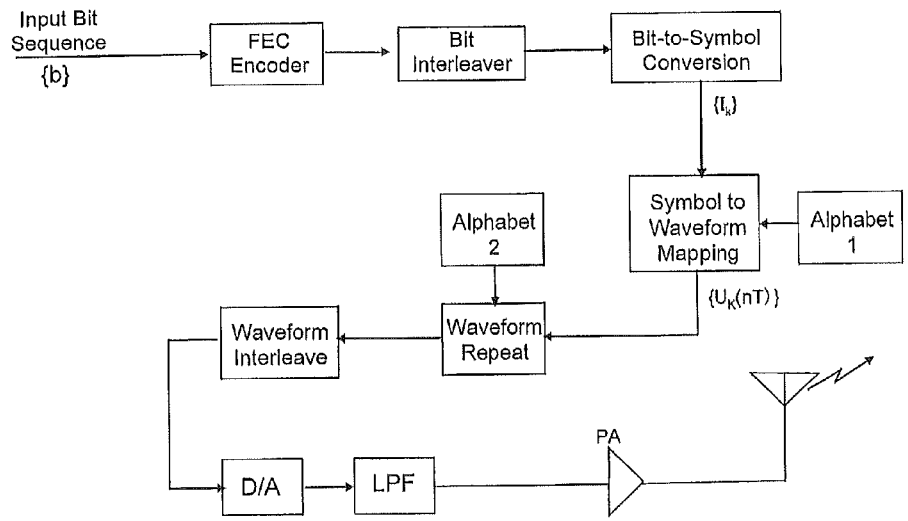
Figure 7
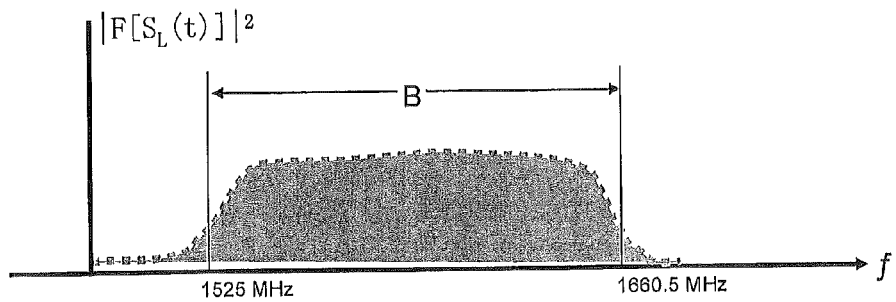
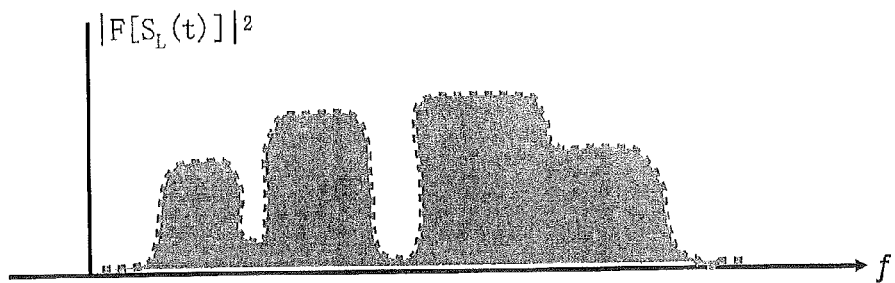
Figure 8

SYSTEMS/METHODS OF ADAPTIVELY VARYING A SPECTRAL CONTENT OF COMMUNICATIONS

CLAIM FOR PRIORITY

This application is a continuation of U.S. patent application Ser. No. 14/287,473, filed May 27, 2014, entitled Systems/Methods of Transmitting Information Via Baseband Waveforms Comprising Frequency Content Agility and an Orthogonality Therebetween, which itself is a continuation of U.S. patent application Ser. No. 14/187,899, filed Feb. 24, 2014, entitled Systems and/or Methods of Wireless Communications, which itself is a continuation of U.S. patent application Ser. No. 13/011,451, filed Jan. 21, 2011, entitled Systems and/or Methods of Increased Privacy Wireless Communications, which itself is a continuation-in-part of U.S. patent application Ser. No. 12/372,354, filed Feb. 17, 2009, entitled Wireless Communications Systems and/or Methods Providing Low Interference, High Privacy and/or Cognitive Flexibility, which itself claims priority to U.S. Provisional Application No. 61/033,114, filed Mar. 3, 2008, entitled Next Generation (XG) Chipless Spread-Spectrum Communications (CSSC), and is a continuation-in-part (CIP) of U.S. application Ser. No. 11/720,115, filed May 24, 2007, entitled Systems, Methods, Devices and/or Computer Program Products For Providing Communications Devoid of Cyclostationary Features, which is a 35 U.S.C. §371 national stage application of PCT Application No. PCT/US2006/020417, filed on May 25, 2006, which claims priority to U.S. Provisional Patent Application No. 60/692,932, filed Jun. 22, 2005, entitled Communications Systems, Methods, Devices and Computer Program Products for Low Probability of Intercept (LPI), Low Probability of Detection (LPD) and/or Low Probability of Exploitation (LPE) of Communications Information, and also claims priority to U.S. Provisional Patent Application No. 60/698,247, filed Jul. 11, 2005, entitled Additional Communications Systems, Methods, Devices and Computer Program Products for Low Probability of Intercept (LPI), Low Probability of Detection (LPD) and/or Low Probability of Exploitation (LPE) of Communications Information and/or Minimum Interference Communications, the entirety of all of which are incorporated herein by reference. The above-referenced PCT International Application was published in the English language as International Publication No. WO 2007/001707.

FIELD

This invention relates to communications systems and methods, and more specifically to wireless communications systems and methods.

BACKGROUND

Wireless communications systems and methods are increasingly being used for voice, data and/or multimedia communications. As the use of these systems/methods continues to increase, available bandwidths may limit the ability to transmit voice/data/multimedia content.

SUMMARY

Embodiments are provided wherein a spectral content of a baseband waveform that is transmitted by a transmitter in order to convey information is varied. According to additional embodiments, a set of frequencies that is used to provide spectral content to the baseband waveform is also varied and comprises non-contiguous first and second frequency intervals wherein a third frequency interval that is between the first and second frequency intervals remains substantially devoid of frequency content in order to reduce or avoid interference. The invention is relevant to 4G LTE carrier aggregation systems/methods and/or other aspects of 4G LTE. Various transmitter/receiver embodiments are disclosed including direct synthesis transmitter/receiver embodiments.

BRIEF DESCRIPTION OF THE DRAWINGS

FIG. 3 is a schematic illustration of waveform generation according to additional embodiments of the present invention.

FIG. 4 is a schematic illustration of further functions of a transmitter according to further embodiments of the present invention.

FIG. 7 is a schematic illustration of further functions of a transmitter according to further embodiments of the present invention.

FIG. 8 is a schematic illustration of spectrum used by a transmitter according to embodiments of the present invention.

DETAILED DESCRIPTION

Figure 1:
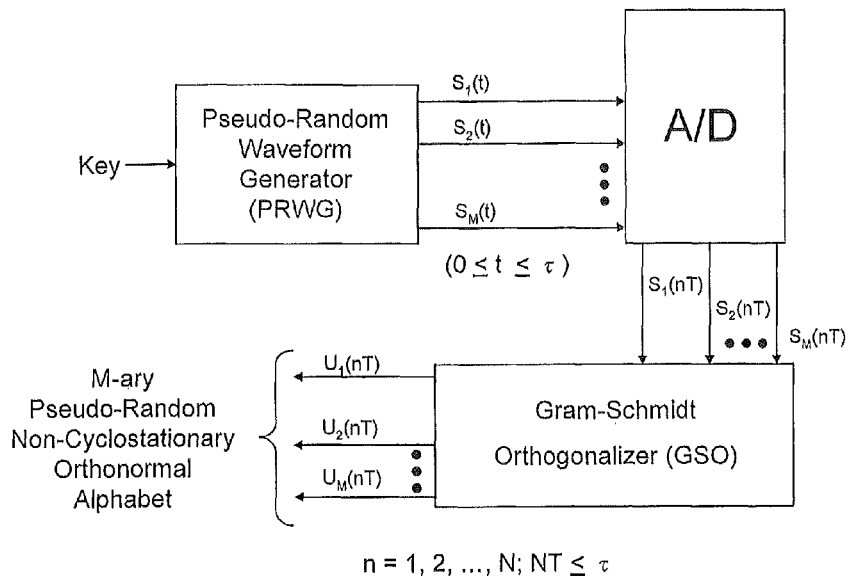
FIG. 1 is a schematic illustration of functions of a transmitter according to embodiments of the present invention.

A wireless communications system configured for Low Probability of Intercept (LPI), Low Probability of Detection (LPD) and/or Low Probability of Exploitation (LPE) communications may use waveforms substantially void of a cyclostationary signature to improve a LPI/LPD/LPE property. It is known that, in general, a set of M independent "seed" waveforms that satisfy a time-bandwidth constraint may be used via a Gram-Schmidt Orthogonalization (GSO) procedure to generate M orthonormal functions. In accordance with exemplary embodiments of the present invention, the M seed waveforms may, for example, be chosen from a band-limited Gaussian-distributed process (such as, for example, Gaussian-distributed pseudo-random noise) and may be used to generate, via an orthogonalization operation, such as, for example, a GSO, a corresponding set of M Gaussian-distributed orthonormal functions substantially void of a cyclostationary property. The set of M Gaussian-distributed orthonormal functions may be used in a communications system to define a signaling alphabet of a transmitter of the communications system (and a corresponding matched filter bank of a receiver of the communications system) to thereby reduce or eliminate a cyclostationary signature of a transmitted communications waveform and thus increase a covertness measure of the communications system. The set of M Gaussian-distributed orthonormal functions may be updated, modified and/or changed as often as necessary to further increase and/or maximize a covertness measure of the communications system. A receiver of the communications system may be equipped with substantially the same algorithm(s) that are used by the transmitter of the communications system and the receiver may be substantially synchronized with the transmitter to thereby re-create and use at the receiver the M Gaussian-distributed orthonormal functions for detection of communications information. The set of M orthonormal functions may, in some embodiments, be a set of orthogonal but not necessarily orthonormal functions. In further embodiments, the set of M orthonormal functions may be non-Gaussian distributed and may be, for example, uniformly distributed, Rayleigh distributed and/or distributed in accordance with any other known (continuous and/or discrete) and/or arbitrary distribution. In still further embodiments of the invention, different functions/elements of an M-ary orthonormal and/or orthogonal signaling alphabet may be differently distributed.

Known systems and/or methods of LPI/LPD/LPE and/or Jam Resistant (JR) Burst Communications (BURSTCOMM) may combine, in general, hybrid spread-spectrum waveforms comprising Frequency-Hopping (FH), Direct Sequence Pseudo-Noise (DSPN) spreading and/or Time-Hopping (TH) to increase covertness and/or resistance to jamming. Transmitting a FH/DSPN spread-spectrum waveform in pseudo-random short bursts using, for example, a TH technique, may, for example, reduce an interceptor's ability to integrate sufficient energy to trigger a delectability threshold associated with a radiometer that the interceptor may be using as a means of signal detection/identification. It is known that a radiometric approach to signal detection/identification may yield a suboptimum and/or unsatisfactory performance measure when attempting to detect/identify/exploit a FH/DSPN/TH spread-spectrum communications signal in a changing noise and/or interference environment. An analysis by Gardner, however, has shown that a cyclic feature of a communications waveform may advantageously be exploited by an interceptor even when a radiometric-based method fails to detect the communications waveform due to a background noise/interference level and/or a signal energy reaching the interceptor's receiver being insufficient over the interceptor's radiometric integration time (see W. A. Gardner, "*Signal Interception: A Unifying Theoretical Framework for Feature Detection*," IEEE Transactions on Communications, Vol. 36, No. 8, August 1988). It is, therefore, desirable to be able to communicate information using waveforms that do not substantially include a cyclostationary signature in order to further reduce the probability of intercept/detection/exploitation of a communications system/waveform that is intended for LPI/LPD/LPE communications.

There are at least two potential advantages associated with signal detection, identification, interception and/or exploitation based on cyclic spectral analysis compared with the energy detection (radiometric) method: (1) A cyclic signal feature (i.e., chip rate and/or symbol rate) may be discretely distributed even if a signal has continuous distribution in a power spectrum. This implies that signals that may have overlapping and/or interfering features in a power spectrum may have a non-overlapping and distinguishable feature in terms of a cyclic characteristic. (2) A cyclic signal feature associated with a signal's cyclostationary property, may be identified via a "cyclic periodogram." The cyclic periodogram of a signal is a quantity that may be evaluated from time-domain samples of the signal, a frequency-domain mapping such as, for example, a Fast Fourier Transform (FFT), and/or discrete autocorrelation operations. Since very large point FFTs and/or autocorrelation operations may be implemented using Very Large Scale Integration (VLSI) technologies, Digital Signal Processors (DSPs) and/or other modern technologies, a receiver of an interceptor may be configured to perform signal Detection, Identification, Interception and/or Exploitation (D/I/I/E) based on cyclic feature detection processing.

Given the potential limitation(s) of the radiometric approach and the potential advantage(s) of cyclic feature detection technique(s) it is reasonable to expect that a sophisticated interceptor may be equipped with a receiver based on cyclic feature detection processing. It is, therefore, of potential interest and potential importance to develop communications systems capable of communicating information void of cyclostationary properties/signatures to thereby render cyclic feature detection processing by an interceptor substantially ineffective.

FIG. 1 illustrates embodiments of generating a communications alphabet comprising M distinct pseudo-random, non-cyclostationary, orthogonal and/or orthonormal waveforms. As illustrated in FIG. 1, responsive to a "key" input (such as, for example, a TRANsmissions SECurity (TRANSEC), a COMMunications SECurity (COMMSEC) and/or any other key input), a Pseudo-Random Waveform Generator (PRWG) may be used to generate a set of M distinct pseudo-random waveforms, which may, according to some embodiments of the invention, represent M ensemble elements of a Gaussian-distributed random process. The M distinct pseudo-random waveforms (e.g., the M ensemble elements) may be denoted as $\{S(t)\}=\{S_1(t), S_2(t), S_M(t)\}; 0 \le t \le \tau$. The set of waveforms $\{S(t)\}$ may be a band-limited set of waveforms having a one-sided bandwidth less than or equal to B Hz. As such, a number of distinct orthogonal and/or orthonormal waveforms that may be generated from the set $\{SW\}$ may, in accordance with established Theorems, be upper-bounded by CTB, where $C \ge 2$ (see, for example, P. M. Dollard, "*On the time-bandwidth concentration of signal functions forming given geometric vector configurations*," IEEE Transactions on Information Theory, IT-10, pp. 328-338, October 1964; also see H. J. Landau and H. O. Pollak, "*Prolate spheroidal wave functions, Fourier analysis and uncertainty—III: The dimension of the space of essentially time-and band-limited signals*," BSTJ, 41, pp. 1295-1336, July 1962).

Figure 2:
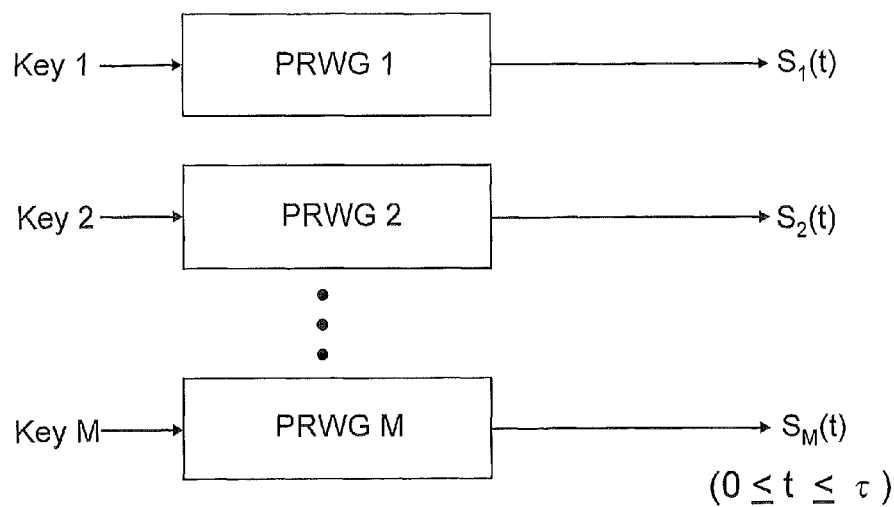
FIG. 2 is a schematic illustration of further functions of a transmitter according to further embodiments of the present invention.

In accordance with some embodiments of the present invention, the $j^{th}$ element of the set of waveforms $\{S(t)\}, S_1(t); j=1, 2, \ldots, M$; may be generated by a respective $j^{th}$ PRWG in response to a respective $j^{th}$ key input, as illustrated in FIG. 2. In some embodiments according to FIG. 2, each of the PRWG is the same PRWG and each key differs relative to each other key. In other embodiments, each key is the same key and each PRWG differs relative to each other PRWG. In further embodiments of FIG. 2, each key differs relative to each other key and each PRWG also differs relative to each other PRWG. Other combinations and subcombinations of these embodiments may be provided. In still other embodiments, a single PRWG and a single key may be used to generate a "long" waveform $S_L(t)$ which may be segmented into M overlapping and/or non-overlapping components to form a set of waveforms $\{S(t)\}$, as illustrated in FIG. 3. In some embodiments, a new set of waveforms $\{S(t)\}$ may be formed periodically, non-periodically, periodically over certain periods of time and/or periodically but with a jitter imposed on a periodicity interval, responsive one or more Time-of-Day (TOD) value(s), as may, for example, be derived from processing of Global Positioning System (GPS) signals, and/or following the transmission of a measure of at least one of the elements of $\{S(t)\}$. In some embodiments, a processor may be operatively configured as a background operation, generating new sets of waveforms $\{S(t)\}$, and storing the new sets of waveforms $\{S(t)\}$ in memory to be accessed and used as needed. In further embodiments, a used set of waveforms $\{S(t)\}$ may be discarded and not used again, whereas in other embodiments, a used set of waveforms $\{S(t)\}$ may be placed in memory to be used again at a later time. In some embodiments, some sets of waveforms $\{S(t)\}$ are used once and then discarded, other sets of waveforms $\{S(t)\}$ are not used at all, and still other sets of waveforms $\{S(t)\}$ are used more than once. Finally, in some embodiments, the waveform duration T and/or the waveform bandwidth B may vary between at least two sets of waveforms and/or between two elements of a given set of waveforms.

Still referring to FIG. 1, the set of substantially continuous-time waveforms $\{S(t)\}=\{S_1(t), S_2(t), S_M(t)\}$; $0 \leq t \leq \tau$; may be transformed from a substantially continuous-time representation to a substantially discrete-time representation using, for example, one or more Analog-to-Digital (A/D) converters and/or one or more Sample-and-Hold (S/H) circuits, to generate a corresponding substantially discrete-time set of waveforms $\{S(nT)\}=\{S_1(nT), S_2(nT), S_M(nT)\}$; $n=1, 2, \ldots, N$; $nT \leq \tau$. A Gram-Schmidt orthogonalizer and/or orthonormalizer and/or any other orthogonalizer and/or orthonormalizer, may then be used, as illustrated in FIG. 1, to generate a set of waveforms $\{U(nT)\}=\{U_1(nT), U_2(nT), U_M(nT)\}$; $n=1, 2, \ldots, N$; $nT \leq \tau$ that are orthogonal and/or orthonormal to one another. The GSO and/or other orthogonalization and/or orthonormalization procedure(s) are known to those skilled in the art and need not be described further herein (see, for example, Simon Haykin, "*Adaptive Filter Theory*," at 173, 301, 497; 1986 by Prentice-Hall; and Bernard Widrow and Samuel D. Stearns "*Adaptive Signal Processing*," at 183; 1985 by Prentice-Hall, Inc.). It will be understood that the sampling interval T may be chosen in accordance with Nyquist sampling theory to thereby preserve by the discrete-time waveforms $\{S(nT)\}$ substantially all of the information contained in the continuous-time waveforms $\{S(t)\}$. It will also be understood that, in some embodiments of the invention, the sampling interval T may be allowed to vary over the duration $\tau$ of one waveform, between different waveforms of a given set of waveforms and/or between different sets of waveforms. Furthermore, the waveform duration $\tau$ may be allowed to vary, in some embodiments, between different waveforms of a given set of waveforms and/or between different sets of waveforms.

The set $\{U(nT)\}=\{U_1(nT), U_2(nT), U_M(nT)\}$; $n=1, 2, \ldots, N$; $NT \leq \tau$, may be used, in some embodiments of the present invention, to define an M-ary pseudo-random and non-cyclostationary alphabet. As illustrated in FIG. 4, an information symbol $I_k$, occurring at a discrete time k (for example, at $t=k\tau$ or, more generally, if the discrete time epochs/intervals are variable, at $t=\tau_k$), and having one of M possible information values, $\{I_1, I_2, \ldots, I_M\}$, may be mapped onto one of the M waveforms of the M-ary alphabet $\{U_1(nT), U_2(nT), U_M(nT)\}$; $n=1, 2, \ldots, N$; $NT \leq \tau$. For example, in some embodiments, if $I_k=I_2$, then during the $k^{th}$ signaling interval the waveform $U_2(nT)$ may be transmitted; $n=1, 2, \ldots, N$; $NT \leq \tau$. It will be understood that transmitting the waveform $U_2(nT)$ comprises transmitting substantially all of the elements (samples) of the waveform $U_2(nT)$ wherein substantially all of the elements (samples) of the waveform $U_2(nT)$ means transmitting $U_2(T), U_2(2T), \ldots,$ and $U_2(NT)$. Furthermore, it will be understood that any unambiguous mapping between the M possible information values of $I_k$ and the M distinct waveforms of the M-ary alphabet, $\{U_1(nT), U_2(nT), U_M(nT)\}$, may be used to communicate information to a receiver (destination) provided that the receiver also has knowledge of the mapping. It will also be appreciated that the ordering or indexing of the alphabet elements and the unambiguous mapping between the M possible information values of $I_k$ and the M distinct waveforms of the M-ary alphabet may be arbitrary, as long as both transmitter (source) and receiver (destination) have knowledge of the ordering and mapping.

In some embodiments of the invention, the information symbol $I_k$, may be constrained to only two possible values (binary system). In such embodiments of the invention, the M-ary alphabet may be a binary (M=2) alphabet comprising only two elements, such as, for example, $\{U_1(nT), U_2(nT)\}$. In other embodiments of the invention, while an information symbol, $I_k$, is allowed to take on one of M distinct values ($M \geq 2$) the alphabet comprises more than M distinct orthogonal/orthonormal waveforms $\{U_1(nT), U_2(nT), U_L(nT)\}$; $L > M$ to thereby increase a distance between a set of M alphabet elements that are chosen and used to communicate information and thus allow an improvement of a communications performance measure such as, for example, an error rate, a propagations distance and/or a transmitted power level. It will be understood that in some embodiments, the number of distinct values that may be made available to an information symbol to thereby allow the information symbol to communicate one or more bits of information, may be reduced or increased responsive to a channel state such as, for example an attenuation, a propagation distance and/or an interference level. In further embodiments, the number of distinct elements comprising the orthogonal/orthonormal alphabet may also change responsive to a channel state. In some embodiments, as a number of information symbol states (values) decreases, a number of distinct elements comprising the orthogonal/orthonormal alphabet increases.

Figure 5:
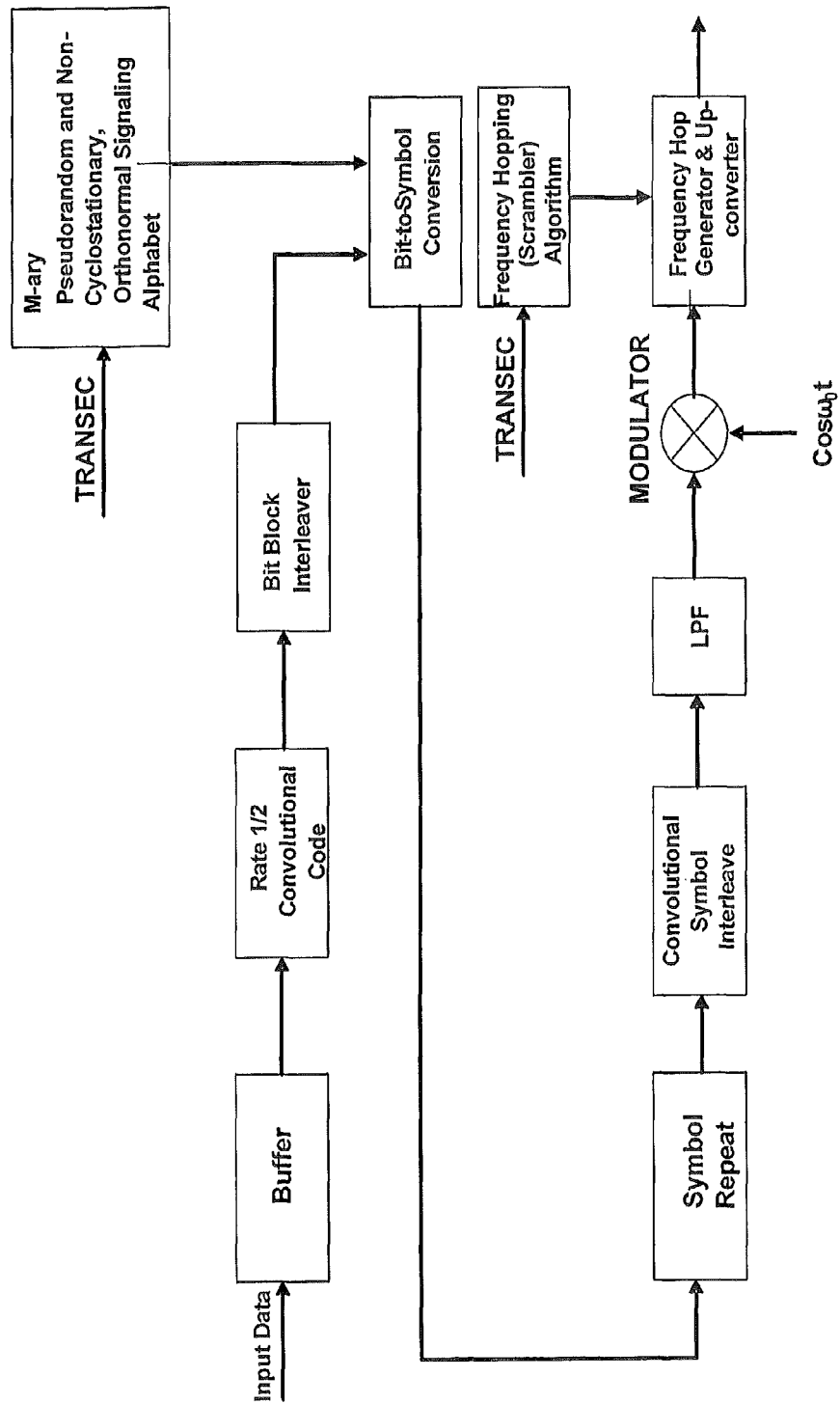
FIG. 5 is a schematic illustration of additional functions of a transmitter according to additional embodiments of the present invention.

It will be understood that at least some conventional transmitter functions comprising, for example, Forward Error Correction (FEC) encoding, interleaving, data repetition, filtering, amplification, modulation, frequency translation, scrambling, frequency hopping, etc., although not shown in FIGS. 1 through 4, may also be used in some embodiments of the present invention to define an overall transmitter chain. At least some of these conventional transmitter functions may be used, in some embodiments, in combination with at least some of the signal processing functions of FIGS. 1 through 4, to specify an overall transmitter signal processing chain. For example, an information bit sequence may be FEC encoded using, for example, a convolutional encoder, interleaved and/or bit-to-symbol converted to define a sequence of information symbols, $\{I_k\}$. The sequence of information symbols, $\{I_k\}$, may then be mapped onto a waveform sequence $\{U_k\}$, as illustrated in FIG. 4. At least some, and in some embodiments all, of the elements of the waveform sequence $\{U_k\}$ may then be repeated, at least once, to increase a redundancy measure, interleaved, filtered, frequency translated, amplified and/or frequency-hopped, for example, (not necessarily in that order) prior to being radiated by an antenna of the transmitter. An exemplary embodiment of a transmitter comprising conventional signal functions in combination with at least some of the signal processing functions of FIGS. 1 through 4, to specify an overall transmitter signal processing chain, is illustrated in FIG. 5.

Figure 6:
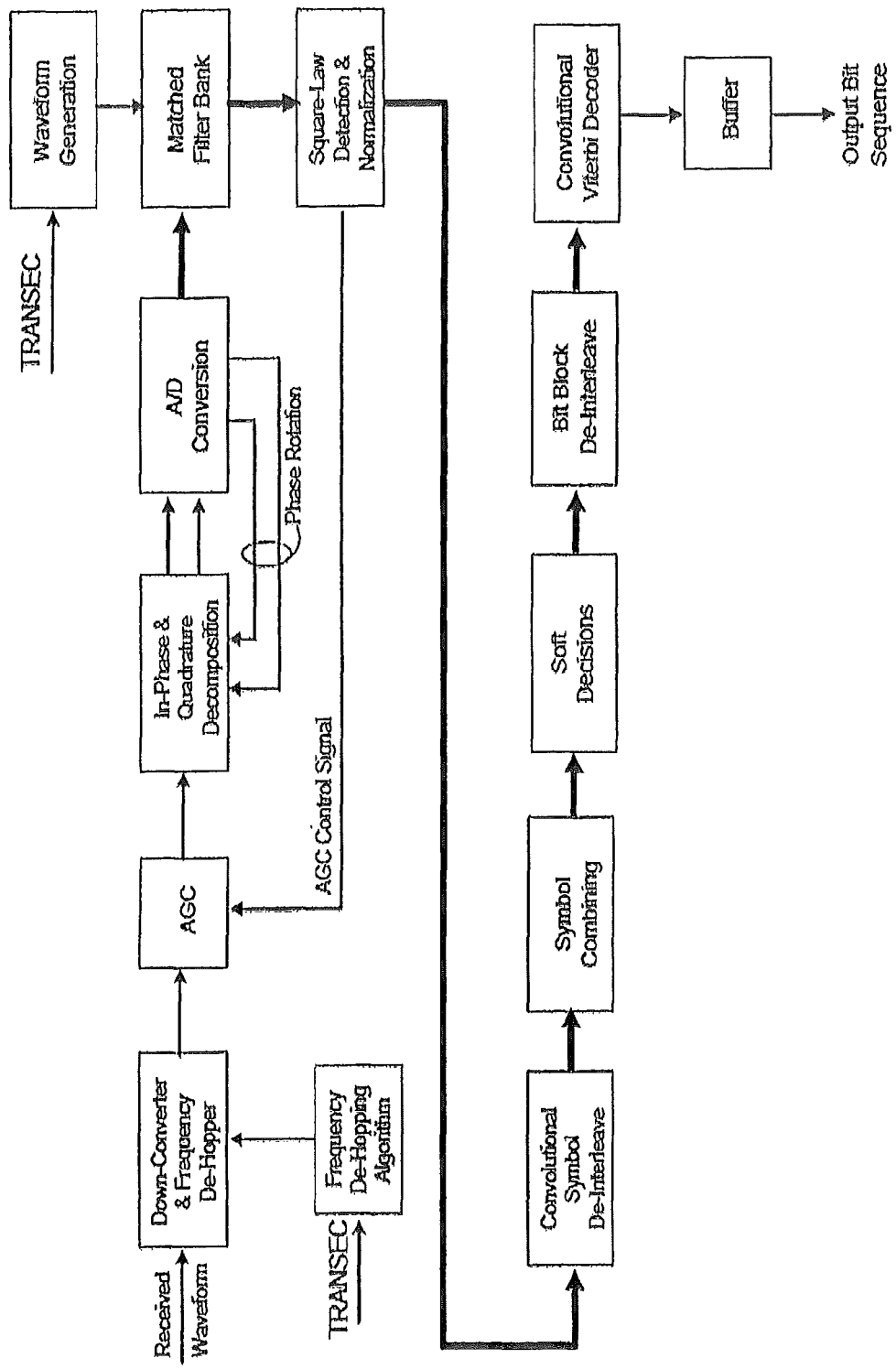
FIG. 6 is a schematic illustration of functions of a receiver according to embodiments of the present invention.

A receiver (destination) that is configured to receive communications information from a transmitter (source) comprising functions of FIGS. 1 through 4, may advantageously be equipped with sufficient information to generate a matched filter bank corresponding (and responsive) to the M-ary alphabet $\{U_1(nT), U_2(nT), U_M(nT)\}$ of FIG. 4. Such a receiver may be substantially synchronized with one or more transmitters using, for example, GPS signal processing. Substantial relative synchronism between a receiver and at least one transmitter may be used and/or may be essential in order to reliably generate and/or update at the receiver the M-ary alphabet functions $\{U_k(nT), U_2(nT), U_M(nT)\}$ and/or the matched filter bank in coordination with one or more transmitters (responsively to TOD and/or key values) to thereby provide the receiver with substantial optimum reception capability. In some embodiments of the invention, all transmitters and receivers are substantially synchronized using GPS signal processing. It will be understood that a receiver may be provided with the appropriate key sequence(s) (e.g., TRANSEC) and the appropriate signal processing algorithms to thereby responsively form and/or update the M-ary alphabet functions and/or the matched filter bank. It will also be understood that a receiver may also be configured with an inverse of conventional transmitter functions that may be used by a transmitter. For example, if, in some embodiments, a transmitter is configured with scrambling, interleaving of data and frequency hopping, then a receiver may be configured with the inverse operations of de-scrambling, de-interleaving of data and frequency de-hopping. An exemplary embodiment of a receiver, which may correspond to the exemplary transmitter embodiment of FIG. 5, is illustrated in FIG. 6.

FIG. 7 illustrates elements of a communications transmitter according to further embodiments of the invention. As shown in FIG. 7, following conventional operations of Forward Error Correction (FEC) encoding, bit interleaving and bit-to-symbol conversion (performed on an input bit sequence $\{b\}$ to thereby form an information symbol sequence $\{I_k\}$), the information symbol sequence $\{I_k\}$ is mapped onto a non-cyclostationary waveform sequence $\{U_k(nT)\}$ using a first M-ary non-cyclostationary orthonormal alphabet (Alphabet 1). An element of $\{U_k(nT)\}$ may then be repeated (at least once), as illustrated in FIG. 7, using a second M-ary non-cyclostationary orthonormal alphabet (Alphabet 2), interleaved, transformed to the continuous-time domain representation, filtered, amplified (not necessarily in that order) and transmitted. The repeat of an element of $\{U_k(nT)\}$ may be performed using a different alphabet (Alphabet 2) in order to reduce or eliminate a cyclostationary feature/signature in the transmitted waveform. For at least the same reason, the at least two alphabets of FIG. 7 may be replaced by new alphabets following the transmission of a predetermined number of waveform symbols. In some embodiments, the predetermined number of waveform symbols is one. As stated earlier, a large reservoir of alphabets may be available and new alphabet choices may be made following the transmission of the predetermined number of waveform symbols and/or at predetermined TOD values.

According to some embodiments of the invention, the M-ary non-cyclostationary orthonormal alphabet waveforms may be broadband waveforms as illustrated in FIG. 8. FIG. 8 illustrates a power spectral density of a broadband waveform defining the M-ary non-cyclostationary orthonormal alphabet (such as, for example, waveform $S_L(t)$ of FIG. 3), over frequencies of, for example, an L-band (e.g., from about 1525 MHz to about 1660.5 MHz). However, FIG. 8 is for illustrative purposes only and the power spectral density of $S_L(t)$ and/or any other set of waveforms used to define the M-ary non-cyclostationary orthonormal alphabet may be chosen to exist over any other frequency range and/or interval(s). In some embodiments, different alphabets may be defined over different frequency ranges/intervals (this feature may provide intrinsic frequency hopping capability). As is further illustrated in FIG. 8 (second trace), certain frequency intervals that warrant protection (or additional protection) from interference, such as, for example, a GPS frequency interval, may be substantially excluded from providing frequency content for the generation of the M-ary non-cyclostationary orthonormal alphabets. It will be appreciated that the transmitter embodiment of FIG. 7 illustrates a "direct synthesis" transmitter in that the transmitter directly synthesizes a transmitted waveform, without resorting to up-conversion and/or carrier modulation. This aspect may further enhance the LPI/LPD/LPE feature(s) of a communications system.

Figure 9:
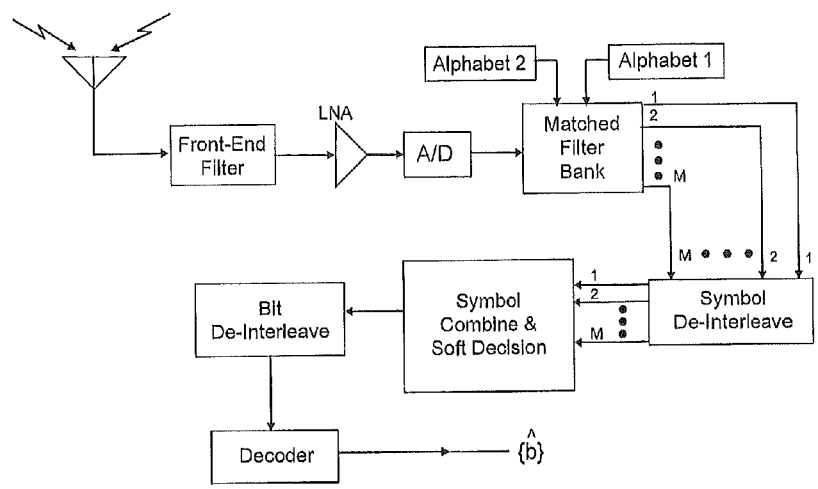
FIG. 9 is a schematic illustration of further functions of a receiver according to further embodiments of the present invention.

A receiver (destination) that is configured to receive communications information from a transmitter (source) comprising the functionality of FIG. 7, may be provided with sufficient information to generate a matched filter bank corresponding to the transmitter waveform set of the M-ary alphabet $\{U_1(nT), U_2(nT), \ldots, U_M(nT)\}$. Such a receiver may be substantially synchronized with the transmitter using GPS-derived TOD. FIG. 9 illustrates elements of such a receiver, according to exemplary embodiments of the present invention. As illustrated in FIG. 9, following front-end filtering, amplification and Analog-to-Digital and/or discrete-time (A/D) conversion of a received waveform, a matched-filter bank, comprising matched filters reflecting the TOD-dependent waveform alphabets used by the transmitter, is used for detection of information. The receiver may have information regarding what waveform alphabet the transmitter may have used as a function of TOD. As such, the receiver, operating in substantial TOD synchronism with the transmitter, may know to configure the matched-filter bank with the appropriate (TOD-dependent) matched filter components to thereby achieve optimum or near optimum signal detection. Following matched-filter detection, symbol de-interleaving and symbol repeat combination, soft decisions of a received symbol sequence may be made, followed by bit de-interleaving and bit decoding, to thereby generate an estimate of a transmitted information bit sequence.

In accordance with some embodiments of the invention, a receiver architecture, such as, for example, the receiver architecture illustrated in FIG. 9, may further configure a matched filter bank to include a "rake" matched filter architecture, to thereby resolve multipath components and increase or maximize a desired received signal energy subject to multipath fading channels. Owing to the broadband nature of the communications alphabets, in accordance with some embodiments of the invention, a significant number of multipath components may be resolvable. Rake matched filter architectures are known to those skilled in the art and need not be described further herein (see, for example, John G. Proakis, "*Digital Communications,*" McGraw-Hill, 1983, section 7.5 starting at 479; also see R. Price and P. E. Green Jr. "*A Communication Technique for Multipath Channels,*" Proc. IRE, Vol. 46, pp. 555-570, March 1958).

Figure 10:
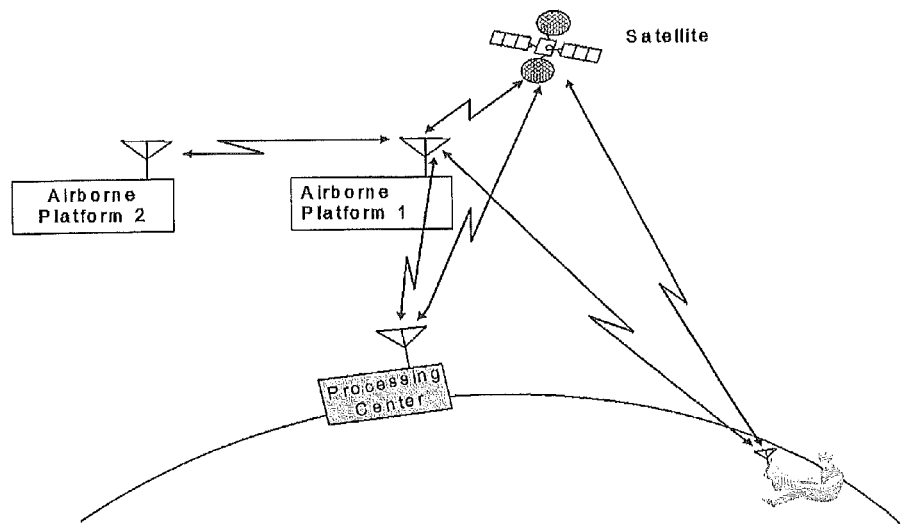
FIG. 10 is a schematic illustration of a communications system based upon one or more transmitters and one or more receivers according to further embodiments of the present invention.
Figure 11:
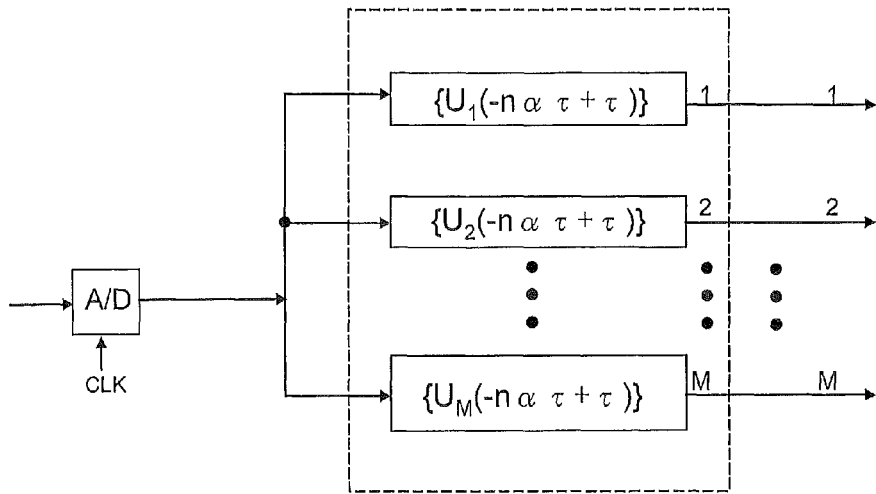
FIGS. 11 through 14 illustrate functions of a receiver according to further embodiments of the present invention.
Figure 12:
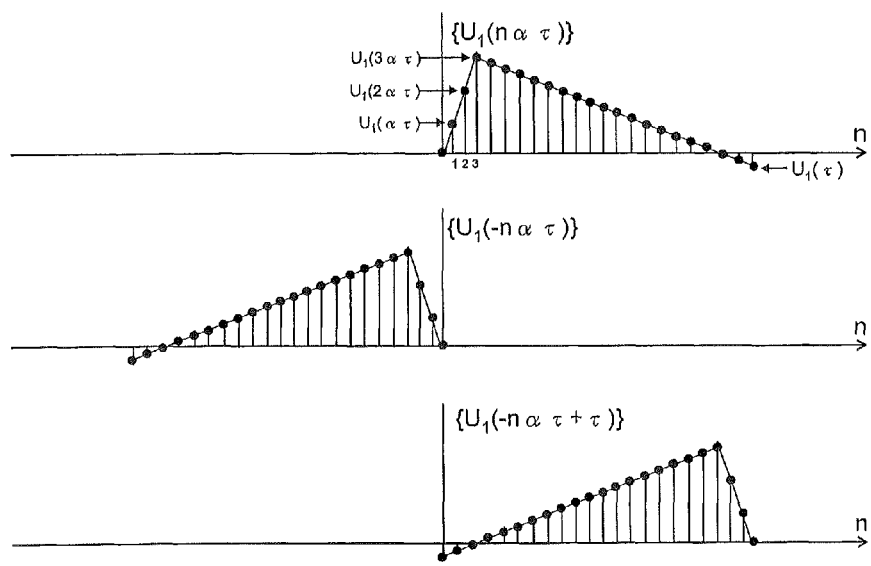
Figure 13:
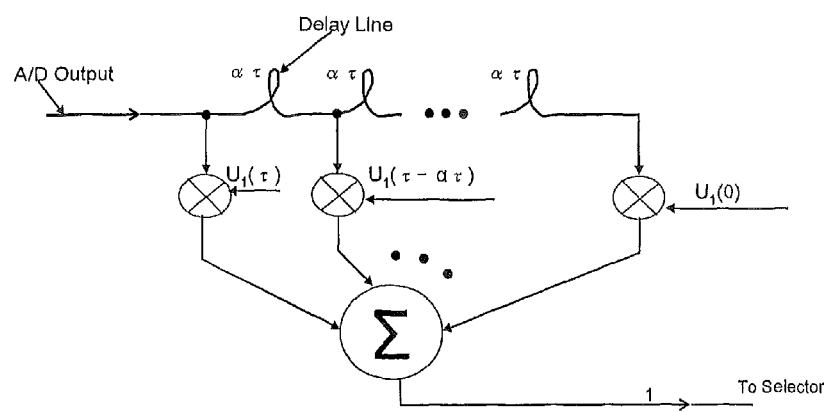
Figure 14:
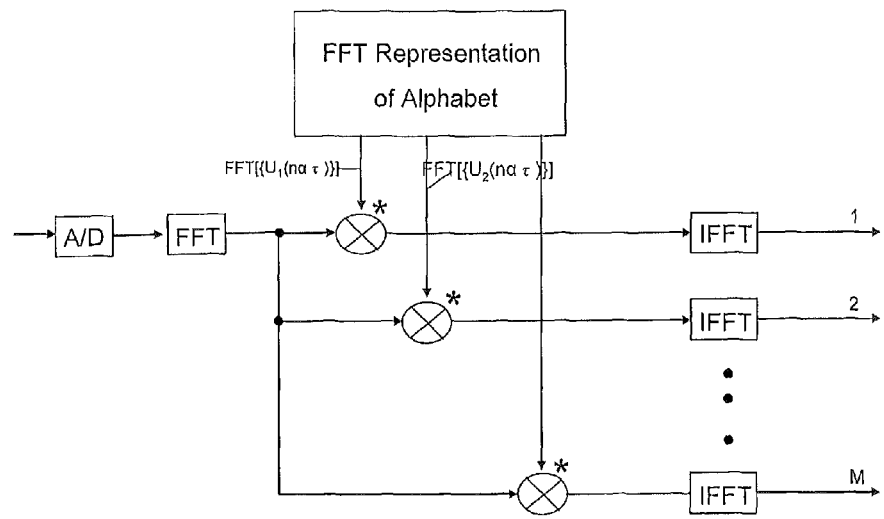

FIG. 10 illustrates an operational scenario relating to a covert communications system, in accordance with some embodiments of the invention, wherein air-to-ground, air-to-air, air-to-satellite and/or satellite-to-ground communications may be conducted. Ground-to-ground communications (not illustrated in FIG. 10) may also be conducted. Modes of communications may be, for example, point-to-point and/or point-to-multipoint. A network topology that is predetermined and/or configured in an ad hoc fashion, in accordance with principles known to those skilled in the art, may be used to establish communications in accordance with any of the embodiments, of the invention and/or combinations thereof.

Figure 15:
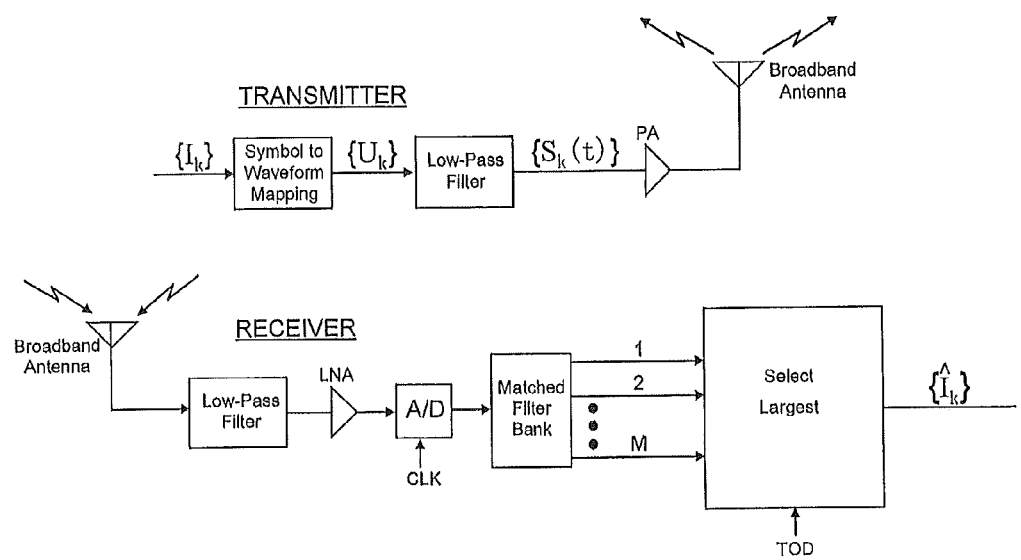
FIG. 15 is a schematic illustration of further functions of a transmitter and receiver according to further embodiments of the present invention.

FIGS. 11 through 14 illustrate elements relating to a matched filter and/or a matched filter bank in accordance with exemplary embodiments of the invention, as will be appreciated by those skilled in the art. FIG. 15 further illustrates elements of a transmitter/receiver combination in accordance with some embodiments of the invention.

In some embodiments of the invention, a transmitter may be configured to selectively radiate a pseudo-random noise waveform (that may be substantially void of information) and may, for example, be Gaussian distributed, occupying a bandwidth that is substantially the same as a bandwidth occupied by a communications waveform. The transmitter may be configured to selectively radiate the pseudo-random noise waveform during periods of time during which no communications information is being transmitted. This may be used, in some embodiments, to create a substantially constant/invariant ambient/background noise floor, that is substantially independent of whether or not communications information is being transmitted, to thereby further mask an onset of communications information transmission.

It will be understood by those skilled in the art that communications systems, waveforms and/or principles described herein may also find applications in systems wherein covertness may not be a primary concern. Communications systems, waveforms and/or principles described herein may, for example, be used to provide short-range wireless communications (that may be broadband short-range wireless communications) in, for example, a home, office, conference and/or business environment while reducing and/or minimizing a level of interference to one or more other communications services that may be using the same, partially the same and/or near-by frequencies as the short-range communications system. Other applications of communications systems, waveforms and/or principles described herein will also occur to those skilled in the art, including, for example, radar applications and/or cellular telecommunications applications. In a cellular telecommunications application, for example, a cellular telecommunications system, in accordance with communications waveform principles described herein, may be configured, for example, as an overlay to one or more conventional cellular/PCS systems and/or one or more other systems, using the frequencies of one or more licensed and/or unlicensed bands (that may also be used by the one or more conventional cellular/PCS systems and/or the one or more other systems) to communicate with user equipment using broadband and/or Ultra Wide-Band (UWB) waveforms. The broadband and/or UWB waveforms may be non-cyclostationary and/or Gaussian-distributed, in accordance with the teachings of the present invention, to thereby reduce and/or minimize a level of interference to the one or more conventional cellular/PCS systems and/or to the one or more other systems by the overlay cellular telecommunications system and thereby allow the overlay cellular telecommunications system to reuse the available spectrum (which is also used by the one or more conventional cellular/PCS systems and/or the one or more other systems) to provide communications services to users. According to some embodiments of a cellular telecommunications application, a cellular telecommunications system that is configured to communicate with user devices using communications waveforms in accordance with the transmitter, receiver and/or waveform principles described herein, is an overlay to one or more conventional cellular/PCS systems and/or to one or more other systems and is using the frequencies of one or more licensed and/or unlicensed bands (also being used by the one or more conventional cellular/PCS systems and/or the one or more other systems) and may be configured to communicate with the user devices preferentially using frequencies of the one or more licensed and/or unlicensed bands that are locally not used substantially and/or are locally used substantially as guardbands and/or transition bands by the one or more conventional cellular/PCS systems and/or the one or more other systems, to thereby further reduce a level of interference between the cellular telecommunications system and the one or more conventional cellular/PCS systems and/or the one or more other systems. As used herein, the terms "locally not used substantially" and/or "locally used substantially as guardbands and/or transition bands" refer to a local service area of a base station and/or group of base stations and/or access point(s) of the cellular telecommunications system. In such a service area, the cellular telecommunications system may, for example, be configured to identify frequencies that are "locally not used substantially" and/or frequencies that are "locally used substantially as guardbands and/or transition bands" by the one or more conventional cellular/PCS systems and/or the one or more other systems and preferentially use the identified frequencies to communicate bidirectionally and/or unidirectionally with user equipment thereby further reducing or minimizing a measure of interference.

Specific exemplary embodiments of the invention have been described with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. It will be understood that when an element is referred to as being "connected" or "coupled" to another element, it can be directly connected or coupled to the other element or intervening elements may be present. Furthermore, "connected" or "coupled" as used herein may include wirelessly connected or coupled.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that although the terms first and second may be used herein to describe various elements, these elements should not be limited by these terms. These terms are only used to distinguish one element from another element. As used herein, the term "and/or" includes any and all combinations of one or more of the associated listed items. The symbol "/" is also used as a shorthand notation for "and/or".

The present invention was described above with reference to block diagrams of methods, apparatus (systems), components and/or computer program products according to embodiments of the invention. It is understood that a given block of the block diagrams, and combinations of blocks in the block diagrams may be implemented by computer program instructions. These computer program instructions may be provided to a processor of a general purpose computer, special purpose computer, such as a digital signal processor, and/or other programmable data processing apparatus to produce a machine, such that the instructions, which execute via the processor of the computer and/or other programmable data processing apparatus, create means for implementing the functions/acts specified in the block diagrams block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagram block or blocks.

In the specification and the Figures thereof, there have been disclosed embodiments of the invention and, although specific terms are employed, they are used in a generic and descriptive sense only and not for purposes of limitation; the scope of the invention being set forth in the following claims.

What is claimed is:

1. A communications method comprising:
   mapping by a transmitter information into a baseband waveform; and
   varying a spectral content of the baseband waveform, without resorting to chipping, by using for said mapping first and second waveform elements that differ therebetween in bandwidth.

2. The communications method according to claim 1, wherein over a first time interval the baseband waveform comprises a first discrete-time waveform comprising a first spectral content; wherein over a second time interval the baseband waveform comprises a second discrete-time waveform comprising a second spectral content that differs from the first spectral content; wherein the first and second time intervals are adjacent one another; and wherein the first and second discrete-time waveforms are used to transmit respective first and second information over said first and second time intervals, respectively.

3. The communications method according to claim 1, wherein said mapping is preceded by:
   processing a bit sequence to obtain the information.

4. The communications method according to claim 1, wherein said varying is followed by:
   further processing the baseband waveform, the spectral content Of which was varied; and
   wirelessly transmitting the information using the baseband waveform that was further processed.

5. The communications method according to claim 1, wherein said first and second waveform elements that differ therebetween in bandwidth comprise respective first and second spectral contents that partially overlap therebetween.

6. The communications method according to claim 5, wherein the first and second waveform elements are used over adjacent transmit/receive intervals.

7. The communications method according to claim 1, wherein said first and second waveform elements that differ therebetween in bandwidth comprise respective first and second spectral contents that are devoid of overlap therebetween.

8. The communications method according to claim 7, wherein the first and second waveform elements are used over adjacent transmit/receive intervals.

9. The communications method according to claim 1, wherein said first and second waveform elements are separated therebetween by a range of frequencies that is devoid of the information that was mapped into the baseband waveform.

10. The communications method according to claim 1, further comprising:
    distributing a frequency content of the baseband waveform over first and second frequency intervals that are separated therebetween by a third frequency interval; and
    refraining from distributing the frequency content over the third frequency interval.

11. The communications method according to claim 1, wherein the baseband waveform comprises a sequence of discrete-time waveforms; wherein a first waveform of the sequence of discrete-time waveforms comprises a first duration; and wherein a second waveform of the sequence of discrete-time waveforms comprises a second duration that differs from the first duration.

12. The communications method according to claim 1, wherein over a first time interval the baseband waveform comprises a first discrete-time waveform comprising a first spectral content; wherein over a second time interval the baseband waveform comprises a second discrete-time waveform comprising a second spectral content that differs from the first spectral content; wherein the first and second time intervals are adjacent transmit/receive intervals; and
    wherein the first and second discrete-time waveforms are used to transmit respective first and second information over said first and second time intervals, respectively.

13. The communications method according to claim 1, wherein the transmitter comprises a mobile transmitter that is stationary relative to the Earth.

14. The communications method according to claim 1, wherein said transmitter is devoid of a plurality of modulators and comprises a single modulator modulating a single carrier frequency; wherein the transmitter comprises a mobile transmitter that is stationary relative to the Earth; and wherein said varying a spectral content of the baseband waveform comprises varying a bandwidth of the baseband waveform over two successive signaling intervals, that are adjacent therebetween, responsive to a transmission of the mobile transmitter while the mobile transmitter remains stationary relative to the Earth.

15. The communications method according to claim 1, wherein said transmitter is devoid of a plurality of modulators and comprises a single modulator modulating a single carrier frequency; wherein said varying a spectral content of the baseband waveform comprises varying a bandwidth of the baseband waveform, and further comprises:
    excluding certain frequency intervals responsive to an interference concern, and varying said bandwidth of the baseband waveform over two successive signaling intervals, that are adjacent therebetween, responsive to a transmission of the transmitter and subject to said excluding certain frequency intervals responsive to an interference concern.

16. The communications method according to claim 1, wherein said transmitter is devoid of a plurality of modulators and comprises a single modulator modulating a single carrier frequency; and
    wherein said mapping by a transmitter information into a baseband waveform comprises:
    evaluating a frequency content;
    forming a desired spectrum shape responsive to the frequency content and responsive to an interference concern; and
    using a time-domain representation of the desired spectrum shape to modulate the single carrier frequency.

17. The communications method according to claim 1, wherein said transmitter is devoid of a plurality of modulators and comprises a single modulator modulating a single carrier frequency; and wherein said mapping by a transmitter information into a baseband waveform comprises:
    forming by the transmitter a sequence of information symbols $\{I_k\}$ responsive to an information bit sequence; and
    mapping by the transmitter the sequence of information symbols $\{I_k\}$ onto a waveform sequence $\{U_k\}$;
    wherein a Fourier transform of the waveform sequence $\{U_k\}$ comprises a plurality of frequencies each one of which comprises a non-zero amplitude that depends upon an information symbol of said sequence of information symbols $\{I_k\}$ but is not the information symbol.

18. The communications method according to claim 1, wherein said transmitter is devoid of a plurality of modulators and comprises a single modulator modulating a single carrier frequency;
    wherein the transmitter comprises a mobile transmitter that is stationary relative to the Earth;
    wherein said varying a spectral content of the baseband waveform comprises varying a bandwidth of the baseband waveform over two successive signaling intervals, that are adjacent therebetween, responsive to a transmission of the mobile transmitter while the mobile transmitter remains stationary relative to the Earth;
    wherein said varying a spectral content of the baseband waveform further comprises:
    excluding certain frequency intervals responsive to an interference concern, and varying said bandwidth of the baseband waveform over two successive signaling intervals, that are adjacent therebetween, responsive to a transmission of the transmitter and subject to said excluding certain frequency intervals responsive to an interference concern;
    wherein said mapping by a transmitter information into a baseband waveform comprises:
    evaluating a frequency content;
    forming a desired spectrum shape responsive to the frequency content and responsive to an interference concern; and
    using a time-domain representation of the desired spectrum shape to modulate the single carrier frequency; and
    wherein said mapping by a transmitter information into a baseband waveform further comprises:
    forming by the transmitter a sequence of information symbols $\{I_k\}$ responsive to an information bit sequence; and
    mapping by the transmitter the sequence of information symbols $\{I_k\}$ onto a waveform sequence $\{U_k\}$;
    wherein a Fourier transform of the waveform sequence $\{U_k\}$ comprises a plurality of frequencies each one of which comprises a non-zero amplitude that depends upon an information symbol of said sequence of information symbols $\{I_k\}$ but is not the information symbol.

19. The communications method according to claim 1, wherein said transmitter is devoid of a plurality of modulators and comprises a single modulator modulating a single carrier frequency; and wherein said varying a spectral content of the baseband waveform comprises varying a bandwidth of the baseband waveform over two successive signaling intervals that are adjacent therebetween.

20. The communications method according to claim 1, further comprising:
    varying said spectral content of the baseband waveform, without resorting to chipping, by using for said mapping said first and second waveform elements further differing therebetween in frequency range while avoiding certain frequency intervals from being included in said spectral content responsive to an interference concern;
    transmitting by said transmitter said first and second waveform elements that differ therebetween in bandwidth and differ therebetween in frequency range over respective first and second transmit/receive time intervals that are adjacent therebetween; and
    transmitting by said transmitter cyclostationary waveforms;
    wherein said transmitter is a transmitter of a cellular telecommunications system wherein covertness is not a primary concern;
    wherein said transmitter is devoid of a plurality of modulators and comprises a single modulator modulating a single carrier frequency; and
    wherein said information that is mapped into said baseband waveform comprises a bit sequence that is operated upon by said transmitter to thereby form an information symbol sequence which is then mapped by said transmitter into said baseband waveform.

21. The communications method according to claim 20, wherein said first and second waveform elements that differ therebetween in bandwidth and differ therebetween in frequency range vary and are orthogonal therebetween over a first time span; and vary and are non-orthogonal therebetween over a second time span.

22. The communications method according to claim 1, further comprising:
    generating by said transmitter cyclostationary waveforms; and
    transmitting by said transmitter cyclostationary waveforms;
    wherein said mapping by a transmitter information into a baseband waveform comprises:
    mapping by the transmitter an input bit sequence $\{b\}$ into an information symbol sequence $\{I_k\}$ and mapping by the transmitter the information symbol sequence $\{I_k\}$ into a discrete-time, cyclostationary, baseband waveform sequence $\{U_k(nT)\}$; wherein k denotes values of discrete time; k=1, 2, . . . ; wherein for each value of k, n takes on a plurality of integer values corresponding to a respective plurality of values of the discrete-time, cyclostationary, baseband waveform $U_k(nT)$; T>0; and
    wherein said mapping by the transmitter the information symbol sequence $\{I_k\}$ into a discrete-time, cyclostationary, baseband waveform sequence $\{U_k(nT)\}$, comprises:
    using first and second discrete-time, cyclostationary, baseband waveform elements, over respective first and second successive and adjacent values of k; said first and second discrete-time, cyclostationary, baseband waveform elements differing therebetween in respective first and second frequency ranges that provide respective first and second frequency contents thereto and further differing therebetween in respective first and second bandwidths thereof; and transmitting by said transmitter said discrete-time, cyclostationary, baseband waveform sequence $\{U_k(nT)\}$ following further processing thereof by the transmitter;

wherein said transmitter is a transmitter of a cellular telecommunications system wherein covertness is not a primary concern; and wherein said transmitter is devoid of a plurality of modulators and comprises a single modulator modulating a single carrier frequency.

23. The communications method according to claim 22, wherein said first and second discrete-time, cyclostationary, baseband waveform elements differing therebetween in respective first and second frequency ranges that provide respective first and second frequency contents thereto and further differing therebetween in respective first and second bandwidths thereof, are orthogonal therebetween.

24. The communications method according to claim 23, wherein a time duration that is associated with said discrete-time, cyclostationary, baseband waveform $U_k(nT)$ varies over different values of k.

25. The communications method according to claim 22, wherein said first and second discrete-time, cyclostationary, baseband waveform elements differing therebetween in respective first and second frequency ranges that provide respective first and second frequency contents thereto and further differing therebetween in respective first and second bandwidths thereof, are non-orthogonal therebetween.

26. The communications method according to claim 25, wherein a time duration that is associated with said discrete-time, cyclostationary, baseband waveform $U_k(nT)$ varies over different values of k.

27. A communications method comprising:
processing by a receiver a waveform that comprises a variable spectral content and is devoid of chipping, by using by the receiver first and second waveform elements that differ therebetween in bandwidth; and
mapping the waveform that was processed into an information sequence.

28. The communications method according to claim 27, wherein said processing by a receiver a waveform is preceded by wirelessly receiving at the receiver a measure of the waveform and wherein said processing by a receiver a waveform further comprises:
using by the receiver a Fourier transform operation;
synchronizing by the receiver said first and second waveform elements that differ therebetween in bandwidth with said variable spectral content; and
detecting an information content of said variable spectral content by using said first and second waveform elements that differ therebetween in bandwidth.

29. The communications method according to claim 28, wherein said synchronizing by the receiver is preceded by wirelessly receiving at the receiver synchronization information.

30. The communications method according to claim 29, wherein said processing by a receiver a waveform further comprises;
using the synchronization information that is wirelessly received at the receiver in said using first and second waveform elements that differ therebetween in bandwidth.

31. The communication method according to claim 27, wherein said mapping is followed by:
generating a bit sequence from said information sequence.

32. The communications method according to claim 27, wherein the receiver comprises a mobile receiver that is stationary relative to the Earth.

33. The communications method according to claim 27, wherein said waveform that comprises a variable spectral content and is devoid of chipping comprises a variable bandwidth that varies over first and second successive signaling intervals thereof that are adjacent therebetween; and
wherein said using by the receiver first and second waveform elements that differ therebetween in bandwidth comprises:
excluding certain frequency intervals from said first and second waveform elements, and using said first and second waveform elements that differ therebetween in bandwidth over said first and second successive signaling intervals, respectively, in order to receive said waveform that comprises the variable bandwidth over the first and second successive signaling intervals thereof that are adjacent therebetween;
wherein said using said first and second waveform elements that differ therebetween in bandwidth over said first and second successive signaling intervals, respectively, in order to receive said waveform that comprises the variable bandwidth over the first and second successive signaling intervals thereof that are adjacent therebetween comprises:
forming first and second Fourier transforms over said first and second successive signaling intervals, respectively.

34. A communications method comprising:
mapping information that is to be transmitted into a baseband waveform;
varying a spectral content of the baseband waveform, without resorting to chipping, by using for said mapping first and second waveform elements that differ therebetween in spectral content;
processing a waveform that comprises a variable spectral content and is devoid of chipping by using first and second waveform elements that differ therebetween in bandwidth; and
mapping the waveform that was processed into a received information sequence.

35. The communications method according to claim 34, wherein over a first time interval the baseband waveform comprises a first discrete-time waveform comprising a first spectral content; wherein over a second time interval the baseband waveform comprises a second discrete-time waveform comprising a second spectral content that differs from the first spectral content; wherein the first and second time intervals are adjacent one another; and wherein the first and second discrete-time waveforms are used to transmit respective first and second information over said first and second time intervals, respectively.

36. The communications method according to claim 34, wherein said mapping information that is to be transmitted into a baseband waveform is preceded by:
processing a bit sequence to obtain the information that is to be transmitted.

37. The communications method according to claim 34, wherein said varying is followed by:
further processing the baseband waveform, the spectral content of which was varied; and
wirelessly transmitting said information that is to be transmitted using the baseband waveform that was further processed.

38. The communications method according to claim 34, wherein said first and second waveform elements that differ therebetween in spectral content further differ therebetween in bandwidth.

39. The communications method according to claim 38, wherein the first and second waveform elements that differ therebetween in spectral content and further differ therebetween in bandwidth are used over adjacent transmit/receive intervals.

40. The communications method according to claim 34, wherein said first and second waveform elements that differ therebetween in spectral content differ therebetween in a frequency range that is being used to provide said spectral content.

41. The communications method according to claim 40, wherein the first and second waveform elements that differ therebetween in spectral content and differ therebetween in said frequency range that is being used to provide said spectral content are used over adjacent transmit/receive intervals.

42. The communications method according to claim 34, wherein said first and second waveform elements that differ therebetween in spectral content are separated therebetween by a range of frequencies that is devoid of the information that was mapped into the baseband waveform.

43. The communications method according to claim 34, further comprising:
distributing a frequency content of the baseband waveform over first and second frequency intervals that are separated therebetween by a third frequency interval; and
refraining from distributing the frequency content over the third frequency interval.

44. The communications method according to claim 34, wherein the baseband waveform comprises a sequence of discrete-time waveforms; wherein a first waveform of the sequence of discrete-time waveforms comprises a first duration; and
wherein a second waveform of the sequence of discrete-time waveforms comprises a second duration that differs from the first duration.

45. The communications method according to claim 34, wherein over a first time interval the baseband waveform comprises a first discrete-time waveform comprising a first spectral content; wherein over a second time interval the baseband waveform comprises a second discrete-time waveform comprising a second spectral content that differs from the first spectral content; wherein the first and second time intervals are adjacent transmit/receive intervals; and wherein the first and second discrete-time waveforms are used to transmit respective first and second information over said first and second time intervals, respectively.

46. The communications method according to claim 34, wherein said processing a waveform comprises:
synchronizing said first and second waveform elements that differ therebetween in bandwidth with said variable spectral content; and
detecting said variable spectral content by using said first and second waveform elements that differ therebetween in bandwidth.

47. The communications method according to claim 34, wherein said processing a waveform comprises:
using a Fourier transform operation.

48. The communications method according to claim 34, wherein said processing a waveform is preceded by:
wirelessly receiving said waveform.

49. The communication method according to claim 34, wherein said mapping the waveform is followed by:
generating a bit sequence from said received information sequence.

50. The communications method according to claim 34, wherein said mapping information, varying a spectral content, processing a waveform, and mapping the waveform are performed by a transceiver comprising a transmitter and a receiver; wherein the transmitter is devoid of a plurality of modulators and comprises a single modulator modulating a single carrier frequency; said transceiver comprising a mobile transceiver that is stationary relative to the Earth; and
wherein said varying a spectral content of the baseband waveform comprises varying a bandwidth of the baseband waveform over two successive signaling intervals, that are adjacent therebetween, responsive to a transmission of the mobile transceiver while the mobile transceiver remains stationary relative to the Earth; and
wherein said waveform that comprises a variable spectral content and is devoid of chipping comprises a variable bandwidth that varies over first and second successive signaling intervals thereof that are adjacent therebetween; and
wherein said using first and second waveform elements that differ therebetween in bandwidth comprises:
excluding certain frequency intervals from said first and second waveform elements, and using said first and second waveform elements that differ therebetween in bandwidth over said first and second successive signaling intervals, respectively, in order to receive said waveform that comprises the variable bandwidth over the first and second successive signaling intervals thereof that are adjacent therebetween;
wherein said using said first and second waveform elements that differ therebetween in bandwidth over said first and second successive signaling intervals, respectively, in order to receive said waveform that comprises the variable bandwidth over the first and second successive signaling intervals thereof that are adjacent therebetween comprises:
forming first and second Fourier transforms over said first and second successive signaling intervals, respectively.

51. The communications method according to claim 34, wherein said mapping information, varying a spectral content, processing a waveform, and mapping the waveform are performed by a transceiver; wherein the transceiver comprises a transmitter and a receiver; wherein the transmitter is devoid of a plurality of modulators and comprises a single modulator modulating a single carrier frequency; and
wherein said varying a spectral content of the baseband waveform comprises varying a bandwidth of the baseband waveform, and further comprises:
excluding certain frequency intervals responsive to an interference concern, and varying said bandwidth of the baseband waveform over two successive signaling intervals, that are adjacent therebetween, responsive to a transmission of the transceiver and subject to said excluding certain frequency intervals responsive to an interference concern;
wherein said waveform that comprises a variable spectral content and is devoid of chipping comprises a variable bandwidth that varies over first and second successive signaling intervals thereof that are adjacent therebetween; and
wherein said using first and second waveform elements that differ therebetween in bandwidth comprises:
excluding certain frequency intervals from said first and second waveform elements, and using said first and second waveform elements that differ therebetween in bandwidth over said first and second successive signaling intervals, respectively, in order to receive said waveform that comprises the variable bandwidth over the first and second successive signaling intervals thereof that are adjacent therebetween;

wherein said using said first and second waveform elements that differ therebetween in bandwidth over said first and second successive signaling intervals, respectively, in order to receive said waveform that comprises the variable bandwidth over the first and second successive signaling intervals thereof that are adjacent therebetween comprises:

forming first and second Fourier transforms over said first and second successive signaling intervals, respectively.

52. The communications method according to claim 34, wherein said mapping information, varying a spectral content, processing a waveform, and mapping the waveform are performed by a transceiver comprising a transmitter and a receiver; and wherein said transmitter is devoid of a plurality of modulators and comprises a single modulator modulating a single carrier frequency; and wherein said mapping information that is to be transmitted into a baseband waveform comprises:

evaluating a frequency content;

forming a desired spectrum shape responsive to the frequency content and responsive to an interference concern; and using a time-domain representation of the desired spectrum shape to modulate the single carrier frequency;

wherein said waveform that comprises a variable spectral content and is devoid of chipping comprises a variable bandwidth that varies over first and second successive signaling intervals thereof that are adjacent therebetween; and wherein said using first and second waveform elements that differ therebetween in bandwidth comprises:

excluding certain frequency intervals from said first and second waveform elements, and using said first and second waveform elements that differ therebetween in bandwidth over said first and second successive signaling intervals, respectively, in order to receive said waveform that comprises the variable bandwidth over the first and second successive signaling intervals thereof that are adjacent therebetween;

wherein said using said first and second waveform elements that differ therebetween in bandwidth over said first and second successive signaling intervals, respectively, in order to receive said waveform that comprises the variable bandwidth over the first and second successive signaling intervals thereof that are adjacent therebetween comprises:

forming first and second Fourier transforms over said first and second successive signaling intervals, respectively.

53. The communications method according to claim 34, wherein said mapping information, varying a spectral content, processing a waveform, and mapping the waveform are performed by a transceiver comprising a transmitter and a receiver; wherein the transmitter is devoid of a plurality of modulators and comprises a single modulator modulating a single carrier frequency; and wherein said mapping information that is to be transmitted into a baseband waveform comprises:

forming by the transmitter a sequence of information symbols $\{I_k\}$ responsive to an information bit sequence; and mapping by the transmitter the sequence of information symbols $\{I_k\}$ onto a waveform sequence $\{U_k\}$;

wherein a Fourier transform of the waveform sequence $\{U_k\}$ comprises a plurality of frequencies each one of which comprises a non-zero amplitude that depends upon an information symbol of said sequence of information symbols $\{I_k\}$ but is not the information symbol;

wherein said waveform that comprises a variable spectral content and is devoid of chipping comprises a variable bandwidth that varies over first and second successive signaling intervals thereof that are adjacent therebetween; and wherein said using first and second waveform elements that differ therebetween in bandwidth comprises:

excluding certain frequency intervals from said first and second waveform, elements, and using said first and second waveform elements that differ therebetween in bandwidth over said first and second successive signaling intervals, respectively, in order to receive said waveform that comprises the variable bandwidth over the first and second successive signaling intervals thereof that are adjacent therebetween;

wherein said using said first and second waveform elements that differ therebetween in bandwidth over said first and second successive signaling intervals, respectively, in order to receive said waveform that comprises the variable bandwidth over the first and second successive signaling intervals thereof that are adjacent therebetween comprises:

forming first and second Fourier transforms over said first and second successive signaling intervals, respectively.

54. The communications method according to claim 34, wherein said mapping information, varying a spectral content, processing a waveform, and mapping the waveform are performed by a transceiver comprising a transmitter and a receiver;

wherein said transmitter is devoid of a plurality of modulators and comprises a single modulator modulating a single carrier frequency;

wherein the transceiver comprises a mobile transceiver that is stationary relative to the Earth;

wherein said varying a spectral content of the baseband waveform comprises varying a bandwidth of the baseband waveform over two successive signaling intervals, that are adjacent therebetween, responsive to a transmission of the mobile transceiver while the mobile transceiver remains stationary relative to the Earth;

wherein said varying a spectral content of the baseband waveform further comprises:

excluding certain frequency intervals responsive to an interference concern, and varying said bandwidth of the baseband waveform over two successive signaling intervals, that are adjacent therebetween, responsive to a transmission of the transceiver and subject to said excluding certain frequency intervals responsive to an interference concern;

wherein said mapping information that is to be transmitted into a baseband waveform comprises:

evaluating a frequency content;

forming a desired spectrum shape responsive to the frequency content and responsive to an interference concern; and using a time-domain representation of the desired spectrum shape to modulate the single carrier frequency;

wherein said mapping information that is to be transmitted into a baseband waveform further comprises:

forming by the transmitter a sequence of information symbols $\{I_k\}$ responsive to an information bit sequence; and mapping by the transmitter the sequence of information symbols $\{I_k\}$ onto a waveform sequence $\{U_k\}$;

wherein a Fourier transform of the waveform sequence $\{U_k\}$ comprises a plurality of frequencies each one of which comprises a non-zero amplitude that depends upon an information symbol of said sequence of information symbols $\{I_k\}$ but is not the information symbol;

wherein said waveform that comprises a variable spectral content and is devoid of chipping comprises a variable bandwidth that varies over first and second successive signaling intervals thereof that are adjacent therebetween; and wherein said using first and second waveform elements that differ therebetween in bandwidth comprises:

excluding certain frequency intervals from said first and second waveform elements, and using said first and second waveform elements that differ therebetween in bandwidth over said first and second successive signaling intervals, respectively, in order to receive said waveform that comprises the variable bandwidth over the first and second successive signaling intervals thereof that are adjacent therebetween;

wherein said using said first and second waveform elements that differ therebetween in bandwidth over said first and second successive signaling intervals, respectively, in order to receive said waveform that comprises the variable bandwidth over the first and second successive signaling intervals thereof that are adjacent therebetween comprises:

forming first and second Fourier transforms over said first and second successive signaling intervals, respectively.

55. The communications method according to claim 34, wherein said mapping information, varying a spectral content, processing a waveform, and mapping the waveform are performed by a transceiver comprising a transmitter and a receiver; wherein the transmitter is devoid of a plurality of modulators and comprises a single modulator modulating a single carrier frequency; and wherein said varying a spectral content of the baseband waveform comprises varying a bandwidth of the baseband waveform over two successive signaling intervals that are adjacent therebetween; and wherein said waveform that comprises a variable spectral content and is devoid of chipping comprises a variable bandwidth that varies over first and second successive signaling intervals thereof that are adjacent therebetween; and wherein said using first and second waveform elements that differ therebetween in bandwidth comprises:

using said first and second waveform elements that differ therebetween in bandwidth over said first and second successive signaling intervals, respectively, in order to receive said waveform that comprises the variable bandwidth over the first and second successive signaling intervals thereof that are adjacent therebetween;

wherein said using said first and second waveform elements that differ therebetween in bandwidth over said first and second successive signaling intervals, respectively, in order to receive said waveform that comprises the variable bandwidth over the first and second successive signaling intervals thereof that are adjacent therebetween comprises:

forming first and second Fourier transforms over said first and second successive signaling intervals, respectively.

56. A communications system comprising:

a processor that is configured to perform operations comprising:

mapping information into a baseband waveform; and varying a spectral content of the baseband waveform, without resorting to chipping, by using for said mapping first and second waveform elements that differ therebetween in bandwidth.

57. The communications system according to claim 56, wherein over a first time interval the baseband waveform comprises a first discrete-time waveform comprising a first spectral content; wherein over a second time interval the baseband waveform comprises a second discrete-time waveform comprising a second spectral content that differs from the first spectral content; wherein the first and second time intervals are adjacent one another; and wherein the first and second discrete-time waveforms are used to transmit respective first and second information over said first and second time intervals, respectively.

58. The communications system according to claim 56, wherein said processor is further configured to process a bit sequence in order to obtain the information.

59. The communications system according to claim 56, wherein said processor is configured to further process the baseband waveform, the spectral content of which was varied, following said varying; and wherein the communication system further comprises a transmitter that is configured to perform operations comprising wirelessly transmitting the information using the baseband waveform that was further processed.

60. The communications system according to claim 56, wherein said first and second waveform elements that differ therebetween in bandwidth comprise respective first and second spectral contents that partially overlap therebetween.

61. The communications system according to claim 56, wherein the first and second waveform elements are used over adjacent transmit/receive intervals.

62. The communications system according to claim 56, wherein said first and second waveform elements that differ therebetween in bandwidth comprise respective first and second spectral contents that are devoid of overlap therebetween.

63. The communications system according to claim 62, wherein the first and second waveform elements are used over adjacent transmit/receive intervals.

64. The communications system according to claim 56, wherein said first and second waveform elements are separated therebetween by a range of frequencies that is devoid of the information that was mapped into the baseband waveform.

65. The communications system according to claim 56, wherein the operations further comprise:

distributing a frequency content of the baseband waveform over first and second frequency intervals that are separated therebetween by a third frequency interval; and refraining from distributing the frequency content over the third frequency interval.

66. The communications system according to claim 56, wherein the baseband waveform comprises a sequence of discrete-time waveforms; wherein a first waveform of the sequence of discrete-time waveforms comprises a first duration; and wherein a second waveform of the sequence of discrete-time waveforms comprises a second duration that differs from the first duration.

67. The communications system according to claim 56, wherein over a first time interval the baseband waveform comprises a first discrete-time waveform comprising a first spectral content; wherein over a second time interval the baseband waveform comprises a second discrete-time waveform comprising a second spectral content that differs from the first spectral content; wherein the first and second time intervals are adjacent transmit/receive intervals; and wherein the first and second discrete-time waveforms are used to transmit respective first and second information over said first and second time intervals, respectively.

68. The communications system according to claim 56, wherein said processor is part of a mobile transmitter that is stationary relative to the Earth; wherein said mobile transmitter is devoid of a plurality of modulators and comprises a single modulator modulating a single carrier frequency; and wherein said varying a spectral content of the baseband waveform comprises varying a bandwidth of the baseband waveform over two successive signaling intervals, that are adjacent therebetween, responsive to a transmission by the mobile transmitter while the mobile transmitter remains stationary relative to the Earth.

69. The communications system according to claim 56, wherein said processor is part of a transmitter; wherein said transmitter is devoid of a plurality of modulators and comprises a single modulator modulating a single carrier frequency; and wherein said varying a spectral content of the baseband waveform comprises varying a bandwidth of the baseband waveform, and further comprises:
excluding certain frequency intervals responsive to an interference concern, and varying said bandwidth of the baseband waveform over two successive signaling intervals, that are adjacent therebetween, responsive to a transmission by the transmitter while subject to said excluding certain frequency intervals responsive to an interference concern.

70. The communications system according to claim 56, wherein said processor is part of a transmitter; wherein the transmitter is devoid of a plurality of modulators and comprises a single modulator modulating a single carrier frequency; and wherein said mapping information into a baseband waveform comprises:
evaluating a frequency content;
forming a desired spectrum shape responsive to the frequency content and responsive to an interference concern; and
using a time-domain representation of the desired spectrum shape to modulate the single carrier frequency.

71. The communications system according to claim 56, wherein said processor is part of a transmitter; wherein the transmitter is devoid of a plurality of modulators and comprises a single modulator modulating a single carrier frequency; and wherein said mapping information into a baseband waveform comprises:
forming a sequence of information symbols $\{I_k\}$ responsive to an information bit sequence; and
mapping the sequence of information symbols $\{I_k\}$ onto a waveform sequence $\{U_k\}$;
wherein a Fourier transform of the waveform sequence $\{U_k\}$ comprises a plurality of frequencies each one of which comprises a non-zero amplitude that depends upon an information symbol of said sequence of information symbols $\{I_k\}$ but is not the information symbol.

72. The communications system according to claim 56, wherein said processor is part of a mobile transmitter that is stationary relative to the Earth; wherein said mobile transmitter is devoid of a plurality of modulators and comprises a single modulator modulating a single carrier frequency;
wherein said varying a spectral content of the baseband waveform comprises varying a bandwidth of the baseband waveform over two successive signaling intervals, that are adjacent therebetween, responsive to a transmission by the mobile transmitter while the mobile transmitter remains stationary relative to the Earth;
wherein said varying a spectral content of the baseband waveform further comprises:
excluding certain frequency intervals responsive to an interference concern, and varying said bandwidth of the baseband waveform over two successive signaling intervals, that are adjacent therebetween, responsive to a transmission by the transmitter while subject to said excluding certain frequency intervals responsive to an interference concern;
wherein said mapping information into a baseband waveform comprises:
evaluating a frequency content;
forming a desired spectrum shape responsive to the frequency content and responsive to an interference concern; and
using a time-domain representation of the desired spectrum shape to modulate the single carrier frequency;
wherein said mapping information into a baseband waveform further comprises:
forming a sequence of information symbols $\{I_k\}$ responsive to an information bit sequence; and
mapping the sequence of information symbols $\{I_k\}$ onto a waveform sequence $\{U_k\}$;
wherein a Fourier transform of the waveform sequence $\{U_k\}$ comprises a plurality of frequencies each one of which comprises a non-zero amplitude that depends upon an information symbol of said sequence of information symbols $\{I_k\}$ but is not the information symbol.

73. The communications system according to claim 56, wherein said processor is part of a transmitter that is devoid of a plurality of modulators and comprises a single modulator modulating a single carrier frequency; and wherein said varying a spectral content of the baseband waveform comprises varying a bandwidth of the baseband waveform over two successive signaling intervals that are adjacent therebetween.

74. The communications system according to claim 56, wherein said processor is part a transmitter and is further configured to perform operations comprising:
varying said spectral content of the baseband waveform, without resorting to chipping, by using for said mapping said first and second waveform elements further differing therebetween in frequency range while excluding certain frequency intervals from being included in said spectral content responsive to an interference concern; and
providing to said transmitter, and transmitting by said transmitter, said first and second waveform elements that differ therebetween in bandwidth and differ therebetween in frequency range over respective first and second transmit/receive time intervals that are adjacent therebetween;
wherein said transmitter is configured to transmit cyclostationary waveforms and is a transmitter of a cellular telecommunications system wherein covertness is not a primary concern;
wherein said transmitter is devoid of a plurality of modulators and comprises a single modulator modulating a single carrier frequency; and
wherein said information that is mapped into said baseband waveform comprises a bit sequence that is operated upon by said processor to thereby form an information symbol sequence which is then mapped by said processor into said baseband waveform.

75. The communications system according to claim 74, wherein said first and second waveform elements that differ therebetween in bandwidth and differ therebetween in frequency range vary and are orthogonal therebetween over a first time span; and vary and are non-orthogonal therebetween over a second time span.

76. The communications system according to claim 56, further comprising:
a transmitter that is connected to said processor;
wherein the processor is configured to perform further operations comprising:
generating discrete-time, cyclostationary, baseband waveforms;
wherein said mapping information into a baseband waveform comprises:
mapping by the processor an input bit sequence {b} into an information symbol sequence $\{I_k\}$ and mapping by the processor the information symbol sequence $\{I_k\}$ into a discrete-time, cyclostationary, baseband waveform sequence $\{U_k(nT)\}$; wherein k denotes values of discrete time; k=1, 2, . . . ; wherein for each value of k, n takes on a plurality of integer values corresponding to a respective plurality of values of the discrete-time, cyclostationary, baseband waveform $U_k(nT)$; T>0; and
wherein said mapping by the processor the information symbol sequence $\{I_k\}$ into a discrete-time, cyclostationary, baseband waveform sequence $\{U_k(nT)\}$, comprises:
using first and second discrete-time, cyclostationary, baseband waveform elements, over respective first and second successive and adjacent values of k; said first and second discrete-time, cyclostationary, baseband waveform elements differing therebetween in respective first and second frequency ranges that provide respective first and second frequency contents thereto and further differing therebetween in respective first and second bandwidths thereof;
providing by the processor said discrete-time, cyclostationary, baseband waveform sequence $\{U_k(nT)\}$ to said transmitter for further processing and transmission thereof; and
transmitting by said transmitter said discrete-time, cyclostationary, baseband waveform sequence $\{U_k(nT)\}$ following said further processing thereof;
wherein said transmitter is a transmitter of a cellular telecommunications system wherein covertness is not a primary concern; and
wherein said transmitter is devoid of a plurality of modulators and comprises a single modulator modulating a single carrier frequency.

77. The communications system according to claim 76, wherein said first and second discrete-time, cyclostationary, baseband waveform elements differing therebetween in respective first and second frequency ranges that provide respective first and second frequency contents thereto and further differing therebetween in respective first and second bandwidths thereof, are orthogonal therebetween.

78. The communications system according to claim 77, wherein a time duration that is associated with said discrete-time, cyclostationary, baseband waveform $U_k(nT)$ varies over different values of k.

79. The communications system according to claim 76, wherein said first and second discrete-time, cyclostationary, baseband waveform elements differing therebetween in respective first and second frequency ranges that provide respective first and second frequency contents thereto and further differing therebetween in respective first and second bandwidths thereof, are non-orthogonal therebetween.

80. The communications system according to claim 79, wherein a time duration that is associated with said discrete-time, cyclostationary, baseband waveform $U_k(nT)$ varies over different values of k.

81. A communications system comprising:
a processor that is configured to perform operations comprising:
processing a waveform that comprises a variable spectral content and is devoid of chipping by using first and second waveform elements that differ therebetween in bandwidth; and
mapping the waveform that was processed into an information sequence.

82. The communications system according to claim 81, further comprising a receiver that is configured to wirelessly receive a measure of the waveform; and wherein said processor is further configured to perform a Fourier transform operation, synchronize said first and second waveform elements that differ therebetween in bandwidth with said variable spectral content and to detect an information content of said variable spectral content by using said first and second waveform elements that differ therebetween in bandwidth.

83. The communications system according to claim 82, wherein said receiver is further configured to wirelessly receive synchronization information.

84. The communications system according to claim 83, wherein said processor is further configured to use the synchronization information that is wirelessly received by the receiver in said using first and second waveform elements that differ therebetween in bandwidth.

85. The communication system according to claim 81, wherein said processor is further configured to generate a bit sequence from said information sequence.

86. The communications system according to claim 81, wherein said processor is part of a receiver;
wherein said waveform that comprises a variable spectral content and is devoid of chipping comprises a variable bandwidth that varies over first and second successive signaling intervals thereof that are adjacent therebetween; and
wherein said using first and second waveform elements that differ therebetween in bandwidth comprises:
excluding certain frequency intervals from said first and second waveform elements, and using said first and second waveform elements that differ therebetween in bandwidth over said first and second successive signaling intervals, respectively, in order to receive said waveform that comprises the variable bandwidth over the first and second successive signaling intervals thereof that are adjacent therebetween;
wherein said using said first and second waveform elements that differ therebetween in bandwidth over said first and second successive signaling intervals, respectively, in order to receive said waveform that comprises the variable bandwidth over the first and second successive signaling intervals thereof that are adjacent therebetween comprises:
forming first and second Fourier transforms over said first and second successive signaling intervals, respectively.

87. A communications system comprising:
a processor that is configured to perform operations comprising:
mapping information that is to be transmitted into a baseband waveform;

varying a spectral content of the baseband waveform, without resorting to chipping, by using for said mapping first and second waveform elements that differ therebetween in spectral content;

processing a waveform that comprises a variable spectral content and is devoid of chipping by using first and second waveform elements that differ therebetween in bandwidth; and mapping the waveform that was processed into a received information sequence.

88. The communications system according to claim 87, wherein over a first time interval the baseband waveform comprises a first discrete-time waveform comprising a first spectral content; wherein over a second time interval the baseband waveform comprises a second discrete-time waveform comprising a second spectral content that differs from the first spectral content; wherein the first and second time intervals are adjacent one another; and wherein the first and second discrete-time waveforms are used to transmit respective first and second information over said first and second time intervals, respectively.

89. The communications system according to claim 87, wherein said processor is further configured to process a bit sequence in order to obtain the information that is to be transmitted.

90. The communications system according to claim 87, wherein the processor is configured to further process the baseband waveform, the spectral content of which was varied, following said varying; and wherein the communication system further comprises a transmitter that is configured to perform operations comprising wirelessly transmitting said information that is to be transmitted using the baseband waveform that was further processed.

91. The communications system according to claim 87, wherein said first and second waveform elements that differ therebetween in spectral content further differ therebetween in bandwidth.

92. The communications system according to claim 91, wherein the first and second waveform elements that differ therebetween in spectral content and further differ therebetween in bandwidth are used over adjacent transmit/receive intervals.

93. The communications system according to claim 87, wherein said first and second waveform elements that differ therebetween in spectral content differ therebetween in a frequency range that is being used to provide said spectral content.

94. The communications system according to claim 93, wherein the first and second waveform elements that differ therebetween in spectral content and differ therebetween in said frequency range that is being used to provide said spectral content are used over adjacent transmit/receive intervals.

95. The communications system according to claim 87, wherein said first and second waveform elements that differ therebetween in spectral content are separated therebetween by a range of frequencies that is devoid of the information that was mapped into the baseband waveform.

96. The communications system according to claim 87, wherein the processor is further configured to distribute a frequency content of the baseband waveform over first and second frequency intervals that are separated therebetween by a third frequency interval; and to refrain from distributing the frequency content over the third frequency interval.

97. The communications system according to claim 87, wherein the baseband waveform comprises a sequence of discrete-time waveforms; wherein a first waveform of the sequence of discrete-time waveforms comprises a first duration; and wherein a second waveform of the sequence of discrete-time waveforms comprises a second duration that differs from the first duration.

98. The communications system according to claim 87, wherein over a first time interval the baseband waveform comprises a first discrete-time waveform comprising a first spectral content; wherein over a second time interval the baseband waveform comprises a second discrete-time waveform comprising a second spectral content that differs from the first spectral content; wherein the first and second time intervals are adjacent transmit/receive intervals; and wherein the first and second discrete-time waveforms are used to transmit respective first and second information over said first and second time intervals, respectively.

99. The communications system according to claim 87, wherein said processor is further configured to synchronize said first and second waveform elements that differ therebetween in bandwidth with said variable spectral content; and to detect an information content of said variable spectral content by using said first and second waveform elements that differ therebetween in bandwidth.

100. The communications system according to claim 87, wherein said processing a waveform comprises:
using a Fourier transform operation.

101. The communications system according to claim 87, further comprising a receiver; wherein said processing a waveform is preceded by wirelessly receiving a measure of said waveform by the receiver.

102. The communications system according to claim 101, wherein the receiver comprises a wireless receiver.

103. The communication system according to claim 87, wherein said processor is further configured to generate a bit sequence from said received information sequence.

104. The communications system according to claim 87, wherein said processor is part of a mobile transceiver that is stationary relative to the Earth; wherein the mobile transceiver comprises a transmitter and a receiver; wherein the transmitter is devoid of a plurality of modulators and comprises a single modulator modulating a single carrier frequency; and wherein said varying a spectral content of the baseband waveform comprises varying a bandwidth of the baseband waveform over two successive signaling intervals, that are adjacent therebetween, responsive to a transmission by the mobile transceiver while the mobile transceiver remains stationary relative to the Earth;

wherein said waveform that comprises a variable spectral content and is devoid of chipping comprises a variable bandwidth that varies over first and second successive signaling intervals thereof that are adjacent therebetween; and wherein said using first and second waveform elements that differ therebetween in bandwidth comprises:

excluding certain frequency intervals from said first and second waveform elements, and using said first and second waveform elements that differ therebetween in bandwidth over said first and second successive signaling intervals, respectively, in order to receive said waveform that comprises the variable bandwidth over the first and second successive signaling intervals thereof that are adjacent therebetween;

wherein said using said first and second waveform elements that differ therebetween in bandwidth over said first and second successive signaling intervals, respectively, in order to receive said waveform that comprises the variable bandwidth over the first and second successive signaling intervals thereof that are adjacent therebetween comprises:

forming first and second Fourier transforms over said first and second successive signaling intervals, respectively.

105. The communications system according to claim 87, wherein said processor is part of a transceiver; wherein the transceiver comprises a transmitter and a receiver; wherein the transmitter is devoid of a plurality of modulators and comprises a single modulator modulating a single carrier frequency; and wherein said varying a spectral content of the baseband waveform comprises varying a bandwidth of the baseband waveform, and further comprises:
  excluding certain frequency intervals responsive to an interference concern, and varying said bandwidth of the baseband waveform over two successive signaling intervals, that are adjacent therebetween, responsive to a transmission by the transmitter and subject to said excluding certain frequency intervals responsive to an interference concern;
  wherein said waveform that comprises a variable spectral content and is devoid of chipping comprises a variable bandwidth that varies over first and second successive signaling intervals thereof that are adjacent therebetween; and
  wherein said using first and second waveform elements that differ therebetween in bandwidth comprises:
  excluding certain frequency intervals from said first and second waveform elements, and using said first and second waveform elements that differ therebetween in bandwidth over said first and second successive signaling intervals, respectively, in order to receive said waveform that comprises the variable bandwidth over the first and second successive signaling intervals thereof that are adjacent therebetween;
  wherein said using said first and second waveform elements that differ therebetween in bandwidth over said first and second successive signaling intervals, respectively, in order to receive said waveform that comprises the variable bandwidth over the first and second successive signaling intervals thereof that are adjacent therebetween comprises:
  forming first and second Fourier transforms over said first and second successive signaling intervals, respectively.

106. The communications system according to claim 87, wherein said processor is part of a transceiver comprising a transmitter and a receiver; wherein the transmitter is devoid of a plurality of modulators and comprises a single modulator modulating a single carrier frequency; and wherein said mapping information that is to be transmitted into a baseband waveform comprises:
  evaluating a frequency content;
  forming a desired spectrum shape responsive to the frequency content and responsive to an interference concern; and
  using a time-domain representation of the desired spectrum shape to modulate the single carrier frequency;
  wherein said waveform that comprises a variable spectral content and is devoid of chipping comprises a variable bandwidth that varies over first and second successive signaling intervals thereof that are adjacent therebetween; and
  wherein said using first and second waveform elements that differ therebetween in bandwidth comprises:
  excluding certain frequency intervals from said first and second waveform elements, and using said first and second waveform elements that differ therebetween in bandwidth over said first and second successive signaling intervals, respectively, in order to receive said waveform that comprises the variable bandwidth over the first and second successive signaling intervals thereof that are adjacent therebetween;
  wherein said using said first and second waveform elements that differ therebetween in bandwidth over said first and second successive signaling intervals, respectively, in order to receive said waveform that comprises the variable bandwidth over the first and second successive signaling intervals thereof that are adjacent therebetween comprises:
  forming first and second Fourier transforms over said first and second successive signaling intervals, respectively.

107. The communications system according to claim 87, wherein said processor is part of a transceiver; wherein the transceiver comprises a transmitter and a receiver; wherein the transmitter is devoid of a plurality of modulators and comprises a single modulator modulating a single carrier frequency; and wherein said mapping information that is to be transmitted into a baseband waveform comprises:
  forming a sequence of information symbols $\{I_k\}$ responsive to an information bit sequence; and
  mapping the sequence of information symbols $\{I_k\}$ onto a waveform sequence $\{U_k\}$;
  wherein a Fourier transform of the waveform sequence $\{U_k\}$ comprises a plurality of frequencies each one of which comprises a non-zero amplitude that depends upon an information symbol of said sequence of information symbols $\{I_k\}$ but is not the information symbol;
  wherein said waveform that comprises a variable spectral content and is devoid of chipping comprises a variable bandwidth that varies over first and second successive signaling intervals thereof that are adjacent therebetween; and
  wherein said using first and second waveform elements that differ therebetween in bandwidth comprises:
  excluding certain frequency intervals from said first and second waveform elements, and using said first and second waveform elements that differ therebetween in bandwidth over said first and second successive signaling intervals, respectively, in order to receive said waveform that comprises the variable bandwidth over the first and second successive signaling intervals thereof that are adjacent therebetween;
  wherein said using said first and second waveform elements that differ therebetween in bandwidth over said first and second successive signaling intervals, respectively, in order to receive said waveform that comprises the variable bandwidth over the first and second successive signaling intervals thereof that are adjacent therebetween comprises:
  forming first and second Fourier transforms over said first and second successive signaling intervals, respectively.

108. The communications system according to claim 87, wherein said processor is part of a transceiver that comprises a transmitter and a receiver;
  wherein the transmitter is devoid of a plurality of modulators and comprises a single modulator modulating a single carrier frequency;
  wherein the transceiver comprises a mobile transceiver that is stationary relative to the Earth; and
  wherein said varying a spectral content of the baseband waveform comprises varying a bandwidth of the baseband waveform over two successive signaling intervals, that are adjacent therebetween, responsive to a transmission by the mobile transceiver while the mobile transceiver remains stationary relative to the Earth;

wherein said varying a spectral content of the baseband waveform further comprises:
excluding certain frequency intervals responsive to an interference concern, and varying said bandwidth of the baseband waveform over two successive signaling intervals, that are adjacent therebetween, responsive to a transmission by the transmitter and subject to said excluding certain frequency intervals responsive to an interference concern;
wherein said mapping information that is to be transmitted into a baseband waveform comprises:
evaluating a frequency content;
forming a desired spectrum shape responsive to the frequency content and responsive to an interference concern; and
using a time-domain representation of the desired spectrum shape to modulate the single carrier frequency;
wherein said mapping information that is to be transmitted into a baseband waveform further comprises:
forming a sequence of information symbols $\{I_k\}$ responsive to an information bit sequence; and
mapping the sequence of information symbols $\{I_k\}$ onto a waveform sequence $\{U_k\}$;
wherein a Fourier transform of the waveform sequence $\{U_k\}$ comprises a plurality of frequencies each one of which comprises a non-zero amplitude that depends upon an information symbol of said sequence of information symbols $\{I_k\}$ but is not the information symbol;
wherein said waveform that comprises a variable spectral content and is devoid of chipping comprises a variable bandwidth that varies over first and second successive signaling intervals thereof that are adjacent therebetween; and
wherein said using first and second waveform elements that differ therebetween in bandwidth comprises:
excluding certain frequency intervals from said first and second waveform elements, and using said first and second waveform elements that differ therebetween in bandwidth over said first and second successive signaling intervals, respectively, in order to receive said waveform that comprises the variable bandwidth over the first and second successive signaling intervals thereof that are adjacent therebetween;
wherein said using said first and second waveform elements that differ therebetween in bandwidth over said first and second successive signaling intervals, respectively, in order to receive said waveform that comprises the variable bandwidth over the first and second successive signaling intervals thereof that are adjacent therebetween comprises:
forming first and second Fourier transforms over said first and second successive signaling intervals, respectively.

109. The communications system according to claim 87, wherein said processor is part of a transceiver; wherein the transceiver comprises a transmitter and a receiver; wherein the transmitter is devoid of a plurality of modulators and comprises a single modulator modulating a single carrier frequency; and wherein said varying a spectral content of the baseband waveform comprises varying a bandwidth of the baseband waveform over two successive signaling intervals that are adjacent therebetween;
wherein said waveform that comprises a variable spectral content and is devoid of chipping comprises a variable bandwidth that varies over first and second successive signaling intervals thereof that are adjacent therebetween; and
wherein said using first and second waveform elements that differ therebetween in bandwidth comprises:
using said first and second waveform elements that differ therebetween in bandwidth over said first and second successive signaling intervals, respectively, in order to receive said waveform that comprises the variable bandwidth over the first and second successive signaling intervals thereof that are adjacent therebetween;
wherein said using said first and second waveform elements that differ therebetween in bandwidth over said first and second successive signaling intervals, respectively, in order to receive said waveform that comprises the variable bandwidth over the first and second successive signaling intervals thereof that are adjacent therebetween comprises:
forming first and second Fourier transforms over said first and second successive signaling intervals, respectively.

\* \* \* \* \*